United States Patent
Gao et al.

(10) Patent No.: US 10,757,701 B2
(45) Date of Patent: Aug. 25, 2020

(54) PHYSICAL UPLINK SHARED CHANNEL DATA TRANSMISSION METHOD AND DEVICE

(71) Applicant: China Academy of Telecommunications Technology, Beijing (CN)

(72) Inventors: Xuejuan Gao, Beijing (CN); Xueming Pan, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/312,276

(22) PCT Filed: May 26, 2017

(86) PCT No.: PCT/CN2017/086219
§ 371 (c)(1),
(2) Date: Dec. 20, 2018

(87) PCT Pub. No.: WO2017/219830
PCT Pub. Date: Dec. 28, 2017

(65) Prior Publication Data
US 2019/0327066 A1    Oct. 24, 2019

(30) Foreign Application Priority Data

Jun. 22, 2016  (CN) .......................... 2016 1 0460685
Aug. 5, 2016   (CN) .......................... 2016 1 0639333
Aug. 15, 2016  (CN) .......................... 2016 1 0671946

(51) Int. Cl.
*H04L 1/18* (2006.01)
*H04L 5/00* (2006.01)
(Continued)

(52) U.S. Cl.
CPC ....... *H04W 72/0446* (2013.01); *H04L 1/1812* (2013.01); *H04L 1/1854* (2013.01);
(Continued)

(58) Field of Classification Search
CPC ... H04L 1/08–1896; H04L 5/0001–26; H04W 28/02–14; H04W 48/02–20;
(Continued)

(56) References Cited

U.S. PATENT DOCUMENTS

2014/0301336 A1    10/2014  Kim et al.
2015/0245346 A1*   8/2015   Yokomakura ..... H04W 72/0413
                                                         370/329
(Continued)

FOREIGN PATENT DOCUMENTS

CN    103297208 A    9/2013
CN    103368708 A    10/2013
(Continued)

*Primary Examiner* — Timothy J Weidner
(74) *Attorney, Agent, or Firm* — Kilpatrick Townsend & Stockton, LLP

(57) ABSTRACT

The application discloses a physical uplink shared channel data transmission method and device. The method comprises: a terminal adjusts or schedules, according to detected downlink control channel data utilizing an uplink DCI format and/or PHICH data in a subframe n, PUSCH data to be transmitted in a special subframe (n+k), wherein k is a predefined value. A base station transmits the downlink control channel data utilizing the uplink DCI format and/or the PHICH data in the subframe n, to adjust or schedule the terminal to transmit the PUSCH data in the special subframe (n+k), wherein k is a predefined value. The application provides a schedule timing definition for transmitting PUSCH data in a special subframe, thereby ensuring normal transmission of the PUSCH data in the special subframe.

8 Claims, 3 Drawing Sheets

---

201 — A UE detects a downlink control channel and/or a PHICH in a sub-frame n

202 — The UE adjusts or schedules PUSCH transmission in a special sub-frame n+k, according to the downlink control channel with the uplink DCI format, and/or the PHICH, detected in the sub-frame n, where k is a predefined value

(51) Int. Cl.
*H04L 5/14* (2006.01)
*H04W 28/04* (2009.01)
*H04W 72/04* (2009.01)
*H04W 72/12* (2009.01)
*H04W 88/02* (2009.01)
*H04W 88/08* (2009.01)
*H04W 92/10* (2009.01)

(52) U.S. Cl.
CPC .......... *H04L 1/1861* (2013.01); *H04L 1/1887* (2013.01); *H04L 1/1893* (2013.01); *H04L 5/0044* (2013.01); *H04L 5/0055* (2013.01); *H04L 5/0092* (2013.01); *H04L 5/0096* (2013.01); *H04L 5/14* (2013.01); *H04W 28/04* (2013.01); *H04W 72/042* (2013.01); *H04W 72/0413* (2013.01); *H04W 72/1257* (2013.01); *H04W 72/1268* (2013.01); *H04W 72/1273* (2013.01); *H04W 72/1284* (2013.01); *H04W 72/1289* (2013.01); *H04W 88/02* (2013.01); *H04W 88/08* (2013.01); *H04W 92/10* (2013.01)

(58) Field of Classification Search
CPC . H04W 72/005–14; H04W 74/002–06; H04W 84/02; H04W 84/04–047; H04W 88/02; H04W 88/04–12; H04W 92/04; H04W 92/10

See application file for complete search history.

(56) References Cited

U.S. PATENT DOCUMENTS

| | | |
|---|---|---|
| 2015/0270916 A1 | 9/2015 | Oizumi et al. |
| 2016/0338049 A1 | 11/2016 | Takeda et al. |
| 2017/0034819 A1* | 2/2017 | Wang ................ H04W 72/0446 370/336 |
| 2017/0105212 A1* | 4/2017 | Li ..................... H04W 72/0446 370/336 |
| 2017/0317790 A1* | 11/2017 | Yao ................... H04W 72/0446 370/329 |

FOREIGN PATENT DOCUMENTS

| | | | |
|---|---|---|---|
| CN | 104144508 A | 11/2014 | |
| EP | 2448150 A2 | 5/2012 | |
| EP | 3151460 A1 | 4/2017 | |
| JP | 2015531553 A | 11/2015 | |
| JP | 2017525241 A | 8/2017 | |
| WO | 2014068839 A1 | 5/2014 | |
| WO | 2015/108008 A1 | 7/2015 | |
| WO | 2015/196460 A1 | 12/2015 | |
| WO | WO-2015196460 A1 * | 12/2015 | ............ H04W 72/12 |

* cited by examiner

PHYSICAL UPLINK SHARED CHANNEL DATA TRANSMISSION METHOD AND DEVICE

This application is a US National Stage of International Application No. PCT/CN2017/086219. filed on May 26, 2017. designating the U.S. and claiming the benefits of Chinese Patent Application No. 201610460685.7, filed with the Chinese Patent Office on Jun. 22, 2016, and entitled "A method and apparatus for transmitting a physical uplink shared channel", Chinese Patent Application No. 201610639333.8, filed with the Chinese Patent Office on Aug. 5, 2016, and entitled "A method and apparatus for transmitting a physical uplink shared channel", and Chinese Patent Application No. 201610671946.X, filed with the Chinese Patent Office on Aug. 15, 2016, and entitled "A method and apparatus for transmitting a physical uplink shared channel", all of which are hereby incorporated by reference in their entireties.

FIELD

The present application relates to the field of communications, and particularly to a method and apparatus for transmitting a physical uplink shared channel.

BACKGROUND

Firstly a frame structure in the existing Long Term Evolution (LTE) Time Division Duplex (TDD) system (in the LTE Rel-8/9/10/11/12/13) will be introduced below.

FIG. 1 is a schematic structural diagram of an LTE TDD frame, and as illustrated, the Frame Structure Type 2 (FS2) is applied to the existing LTE TDD system, and in the TDD system, there are different sub-frames or timeslots, at the same frequency, for uplink and downlink transmission. In the FS2, each 10 ms radio frame includes two 5 ms half-frames, and each half-frame includes five 1 ms sub-frames. The sub-frames in the FS2 are categorized into three categories: downlink sub-frames, uplink sub-frames, and special sub-frames, and each special sub-frame includes three components of a Downlink Pilot Time Slot (DwPTS), a Guard Period (GP), and an Uplink Pilot Time Slot (UpPTS). Table 1 depicts seven uplink-downlink sub-frame configurations supported in the FS2. Ten configurations for special sub-frame as depicted in Table 2 have been supported in the LTE Rel-13, and in each configuration, the lengths of symbols in a DwPTS and an UpPTS are specified, and the length of a GP can be determined as the difference between the total number of symbols in a sub-frame, and the lengths of symbols in the DwPTS and the UpPTS. In Table 2. X is a value configured in higher-layer signaling to additionally extend the length of the UpPTS, and X=2 or 4 symbols are supported, so that a part of the GP is allotted for the UpPTS. A downlink pilot, downlink service data (e.g., a downlink shared channel), and downlink control signaling (e.g., a downlink control channel) can be transmitted in the DwPTS, no signal is transmitted in the GP, and only a random access and a Sounding Reference Symbol (SRS), but neither uplink service (e.g., an uplink shared channel) nor uplink control information (e.g., an uplink control channel) can be transmitted in the UpPTS.

TABLE 1

Uplink-downlink sub-frame configuration

| Uplink-downlink configuration | Downlink-to-Uplink switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

Special sub-frame configuration

| Special sub-frame configuration | Normal Cyclic Prefix (CP) in the downlink | | | Extended Cyclic Prefix (CP) in the downlink | | |
|---|---|---|---|---|---|---|
| | | UpPTS | | | UpPTS | |
| | DwPTS | Normal cyclic prefix in the uplink | Extended cyclic prefix in the uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2692 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Feedback timing of Acknowledgment (ACK)/Negative Acknowledgement (NACK) for a Physical Uplink Shared Channel (PUSCH) in the existing LTE TDD system will be described below.

In the existing LTE TDD system, a Physical Uplink Shared Channel (PUSCH) is only transmitted in an uplink sub-frame. A UE transmitting a PUSCH in an uplink sub-frame numbered n receives a Physical Hybrid-ARQ Indicator Channel (PHICH) in a downlink sub-frame numbered $n+k_{PHICH}$ to obtain ACK/NACK feedback information of the PUSCH, where the HARQ stands for a Hybrid Automatic Repeat reQuest, and $k_{PHICH}$ is defined as depicted in Table 3; and if the PHICH carries NACK, then the UE will retransmit the PUSCH according to transmission configuration of an immediately preceding PUSCH. Moreover the UE further needs to detect the sub-frame, in which the PHICH is detected, for a downlink control channel with a Downlink Control Information (DCI) format in the uplink (a downlink control channel carrying an uplink (UL) grant), where the downlink control channel includes a New Data Indicator (NDI). For dynamic scheduling, whether the NDI is inverted indicates whether there are new data, and for example, an NDI in a corresponding downlink control channel when the PUSCH is initially transmitted is 0, so if a downlink control channel with an NDI) is received in the sub-frame in which the PHICH is detected after the PUSCH, then the NDI will have not been inverted, so the PUSCH is scheduled by the downlink control channel to be retransmitted; and for semi-persistent scheduling, if the NDI is 1, then it will represent retransmission, and if the NDI is 0, then it will represent activation/deactivation scheduling signaling; and if the NDI indicates new data, then the first transmission of a new PUSCH will be scheduled by the downlink control channel, and if the NDI indicates retransmission, then retransmission of a preceding PUSCH will be scheduled by the downlink control channel. Accordingly both the PHICH, and the downlink control channel with the uplink DCI format can schedule retransmission of a PUSCH, and the downlink control channel with the uplink DCI format can also schedule transmission of a new PUSCH, i.e., initial transmission thereof. If both a PHICH and a downlink control channel are detected in a sub-frame for detecting the PHICH, then reference will be made to information in the downlink control channel, that is, whether to retransmit a PUSCH will be decided according to an NDI in the downlink control channel, and if so, then the PUSCH will be retransmitted according to scheduling information indicated by the downlink control channel (which may be different from scheduling information for initial transmission); and only a PHICH is received, and the PHICH indicates NACK, then the PUSCH will be retransmitted according to the same configuration as initial transmission thereof. Accordingly the downlink control channel with the uplink DCI format may not be detected in the sub-frame for detecting the PHICH, and if no downlink control channel is detected, then whether to retransmit the PUSCH will be decided according to the feedback information carried in the PHICH; and if the downlink control channel is detected, then whether to retransmit the PUSCH will be decided according to the downlink control channel with the uplink DCI format.

Furthermore there is also defined a sub-frame in which the corresponding PUSCH is retransmitted or initially transmitted when the UE detects the downlink control channel with the uplink DCI format, and/or the PHICH, i.e., scheduling timing of the PUSCH, as depicted in Table 4. The UE adjusts the transmission of PUSCH in the sub-frame n+k according to the downlink control channel with the uplink DCI format, and/or the PHICH, detected in the sub-frame n.

TABLE 3

$k_{PHICH}$ for TDD

| TDD UL/DL configuration | Sub-frame index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

TABLE 4 k for TDD configurations 0-6

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | | 7 | 7 | | 5 |

It shall be noted that the sub-frames are indexed in Tables 3 and 4 in the unit of a radio frame, and for a sub-frame indexed n+k, if n+k is greater than 9, then the sub-frame will be a sub-frame in a next radio frame.

A drawback in the prior art lies in that: in the existing LTE system, transmission of a PUSCH in an UpPTS in a special sub-frame is not supported, so scheduling timing of the PUSCH in the UpPTS in the special sub-frame has not been defined yet.

SUMMARY

The application provides a method and apparatus for transmitting a PUSCH so as to enable PUSCH transmission in an UpPTS in a special sub-frame.

An embodiment of the application provides a method for transmitting a PUSCH, the method including:

adjusting or scheduling, by a UE, a PUSCH to be transmitted in a special sub-frame n+k, according to a downlink control channel with an uplink DCI format, and/or a PHICH, detected in a sub-frame n, wherein k is a predefined value.

Optionally for a TDD uplink-downlink configuration 0, in a sub-frame n=0 or 5, k=6 or 11 is defined for a PHICH and/or a downlink control channel corresponding to a special sub-frame; or in a sub-frame n=1 or 6, k=5 or 10 is defined for a PHICH and/or a downlink control channel corresponding to a special sub-frame.

Optionally the downlink control channel corresponding to the special sub-frame is a downlink control channel, corresponding to the special sub-frame, determined according to a 2-bit uplink (UL) index indicator in the downlink control channel.

Optionally when both an LSB and an MSB in the UL index are set to 0, the downlink control channel corresponds to a PUSCH transmitted in the special sub-frame, and when at least one of the LSB or the MSB in the UL index is set to 1, the downlink control channel corresponds to a PUSCH transmitted in a normal uplink sub-frame.

Optionally for a TDD uplink-downlink configuration 1, in a sub-frame n=0 or 5, k=6 or 11 is defined; or for a TDD uplink-downlink configuration 1, in a sub-frame n=4 or 9, k=2 or 7 or 12 is defined for a PHICH and/or a downlink control channel corresponding to a special sub-frame; or in a sub-frame n=1 or 6, k=5 or 10 is defined for a PHICH and/or a downlink control channel corresponding to a special sub-frame.

Optionally for a TDD uplink-downlink configuration 2, in a sub-frame n=4 or 9, k=2 or 7 or 12 is defined; or in a sub-frame n=0 or 5, k=6 or 11 is defined; or in a sub-frame n=1 or 6, k=5 or 10 is defined; or for a TDD uplink-downlink configuration 2, in a sub-frame n=3 or 8, k=3 or 8 or 13 is defined for a PHICH and/or a downlink control channel corresponding to a special sub-frame.

Optionally for a TDD uplink-downlink configuration 3, in a sub-frame n=7, k=4 is defined; or in a sub-frame n=5, k=6 is defined; or in a sub-frame n=6, k=5 is defined; or in a sub-frame n=1, k=10 is defined; or for a TDD uplink-downlink configuration 3, in a sub-frame n=8, k=3 or 13 is defined for a PHICH and/or a downlink control channel corresponding to a special sub-frame; or in a sub-frame n=9, k=2 or 12 is defined for a PHICH and/or a downlink control channel corresponding to a special sub-frame; or in a sub-frame n=0, k=11 is defined for a PHICH and/or a downlink control channel corresponding to a special sub-frame.

Optionally for a TDD uplink-downlink configuration 4, in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or for a TDD uplink-downlink configuration 4, in a sub-frame n=8, k=3 or 13 is defined for a PHICH and/or a downlink control channel corresponding to a special sub-frame; or in a sub-frame n=9, k=2 or 12 is defined for a PHICH and/or a downlink control channel corresponding to a special sub-frame.

Optionally for a TDD uplink-downlink configuration 5, in a sub-frame n=3, k=8 is defined, in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or in a sub-frame n=9, k=2 or 12 is defined; or for a TDD uplink-downlink configuration 5, in a sub-frame n=8, k=3 or 13 is defined for a PHICH and/or a downlink control channel corresponding to a special sub-frame.

Optionally for a TDD uplink-downlink configuration 6, in a sub-frame n=0 or 5, k=6 or 11 is defined for a PHICH and/or a downlink control channel corresponding to a special sub-frame; or in a sub-frame n=1 or 6, k=5 or 10 is defined for a PHICH and/or a downlink control channel corresponding to a special sub-frame; or in a sub-frame n=9, k=2 or 7 or 12 is defined for a PHICH and/or a downlink control channel corresponding to a special sub-frame.

Optionally the PHICH corresponding to the special sub-frame is a PHICH corresponding to $I_{PHICH}=2$, or a PHICH corresponding to $I_{PHICH}=1$, wherein $I_{PHICH}$ is a parameter for determining a PHICH resource.

Optionally the downlink control channel corresponding to the special sub-frame is a downlink control channel, corresponding to the special sub-frame, determined according to an RNTI or the size of DCI or an indicator in DCI.

An embodiment of the application provides a method for transmitting a PUSCH, the method including:

transmitting, by an base station, a downlink control channel with an uplink DCI format, and/or a PHICH, in a sub-frame n to adjust or schedule a UE to transmit a PUSCH in a special sub-frame n+k, wherein k is a predefined value.

Optionally for a TDD uplink-downlink configuration 0, in a sub-frame n=0 or 5, k=6 or 11 is defined for a PHICH and/or a downlink control channel corresponding to a special sub-frame; or in a sub-frame n=1 or 6, k=5 or 10 is defined for a PHICH and/or a downlink control channel corresponding to a special sub-frame.

Optionally the downlink control channel corresponding to a special sub-frame is a downlink control channel, corresponding to a special sub-frame, determined according to a 2-bit uplink (UL) index indicator in the downlink control channel.

Optionally when both an LSB and an MSB in the UL index are set to 0, the downlink control channel corresponds to a PUSCH transmitted in the special sub-frame, and when at least one of the LSB or the MSB in the UL index is set to 1, the downlink control channel corresponds to a PUSCH transmitted in a normal uplink sub-frame.

Optionally for a TDD uplink-downlink configuration 1, in a sub-frame n=0 or 5, k=6 or 11 is defined; or for a TDD uplink-downlink configuration 1, in a sub-frame n=4 or 9, k=2 or 7 or 12 is defined for a PHICH and/or a downlink control channel corresponding to a special sub-frame; or in a sub-frame n=1 or 6, k=5 or 10 is defined for a PHICH and/or a downlink control channel corresponding to a special sub-frame.

Optionally for a TDD uplink-downlink configuration 2, in a sub-frame n=4 or 9, k=2 or 7 or 12 is defined; or in a sub-frame n=0 or 5, k=6 or 11 is defined; or in a sub-frame n=1 or 6, k=5 or 10 is defined; or for a TDD uplink-downlink configuration 2, in a sub-frame n=3 or 8, k=3 or 8 or 13 is defined for a PHICH and/or a downlink control channel corresponding to a special sub-frame.

Optionally for a TDD uplink-downlink configuration 3, in a sub-frame n=7, k=4 is defined; or in a sub-frame n=5, k=6 is defined; or in a sub-frame n=6, k=5 is defined; or in a sub-frame n=1, k=10 is defined; or for a TDD uplink-downlink configuration 3, in a sub-frame n=8, k=3 or 13 is defined for a PHICH and/or a downlink control channel corresponding to a special sub-frame; or in a sub-frame n=9, k=2 or 12 is defined for a PHICH and/or a downlink control channel corresponding to a special sub-frame; or in a sub-frame n=0, k=11 is defined for a PHICH and/or a downlink control channel corresponding to a special sub-frame.

Optionally for a TDD uplink-downlink configuration 4, in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or for a TDD uplink-downlink configuration 4, in a sub-frame n=8, k=3 or 13 is defined for a PHICH and/or a downlink control channel corresponding to a special sub-frame; or in a sub-frame n=9, k=2 or 12 is defined for a PHICH and/or a downlink control channel corresponding to a special sub-frame.

Optionally for a TDD uplink-downlink configuration 5, in a sub-frame n=3, k=8 is defined, in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or in a sub-frame n=9, k=2 or 12 is defined; or for a TDD uplink-downlink configuration 5, in a sub-frame n=8, k=3 or 13 is defined for a PHICH and/or a downlink control channel corresponding to a special sub-frame.

Optionally for a TDD uplink-downlink configuration 6, in a sub-frame n=0 or 5, k=6 or 11 is defined for a PHICH and/or a downlink control channel corresponding to a special sub-frame; or in a sub-frame n=1 or 6, k=5 or 10 is defined for a PHICH and/or a downlink control channel corresponding to a special sub-frame; or in a sub-frame n=9, k=2 or 7 or 12 is defined for a PHICH and/or a downlink control channel corresponding to a special sub-frame.

Optionally the PHICH corresponding to the special sub-frame is a PHICH corresponding to $I_{PHICH}$=2, or a PHICH corresponding to $I_{PHICH}$=1, wherein $I_{PHICH}$ is a parameter for determining a PHICH resource.

Optionally the downlink control channel corresponding to the special sub-frame is a downlink control channel, corresponding to the special sub-frame, determined according to an RNTI or the size of DCI or an indicator in DCI.

An embodiment of the application provides an apparatus for transmitting a PUSCH, the apparatus including:

a detecting module configured to detect a downlink control channel and/or a PHICH in a sub-frame n; and an adjusting module configured to adjust or schedule a PUSCH to be transmitted in a special sub-frame n+k, according to the downlink control channel with an uplink DCI format, and/or the PHICH, detected in the sub-frame n, wherein k is a predefined value.

Optionally for a TDD uplink-downlink configuration 0, in a sub-frame n=0 or 5, k=6 or 11 is defined for a PHICH and/or a downlink control channel corresponding to a special sub-frame; or in a sub-frame n=1 or 6, k=5 or 10 is defined for a PHICH and/or a downlink control channel corresponding to a special sub-frame.

Optionally the downlink control channel corresponding to the special sub-frame is a downlink control channel, corresponding to the special sub-frame, determined according to a 2-bit uplink (UL) index indicator in the downlink control channel.

Optionally when both an LSB and an MSB in the UL index are set to 0, the downlink control channel corresponds to a PUSCH transmitted in the special sub-frame, and when at least one of the LSB or the MSB in the UL index is set to 1, the downlink control channel corresponds to a PUSCH transmitted in a normal uplink sub-frame.

Optionally for a TDD uplink-downlink configuration 1, in a sub-frame n=0 or 5, k=6 or 11 is defined; or for a TDD uplink-downlink configuration 1, in a sub-frame n=4 or 9, k=2 or 7 or 12 is defined for a PHICH and/or a downlink control channel corresponding to a special sub-frame; or in a sub-frame n=1 or 6, k=5 or 10 is defined for a PHICH and/or a downlink control channel corresponding to a special sub-frame.

Optionally for a TDD uplink-downlink configuration 2, in a sub-frame n=4 or 9, k=2 or 7 or 12 is defined; or in a sub-frame n=0 or 5, k=6 or 11 is defined; or in a sub-frame n=1 or 6, k=5 or 10 is defined; or for a TDD uplink-downlink configuration 2, in a sub-frame n=3 or 8, k=3 or 8 or 13 is defined for a PHICH and/or a downlink control channel corresponding to a special sub-frame.

Optionally for a TDD uplink-downlink configuration 3, in a sub-frame n=7, k=4 is defined; or in a sub-frame n=5, k=6 is defined; or in a sub-frame n=6, k=5 is defined; or in a sub-frame n=1, k=10 is defined; or for a TDD uplink-downlink configuration 3, in a sub-frame n=8, k=3 or 13 is defined for a PHICH and/or a downlink control channel corresponding to a special sub-frame; or in a sub-frame n=9, k=2 or 12 is defined for a PHICH and/or a downlink control channel corresponding to a special sub-frame; or in a sub-frame n=0, k=11 is defined for a PHICH and/or a downlink control channel corresponding to a special sub-frame.

Optionally for a TDD uplink-downlink configuration 4, in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or for a TDD uplink-downlink configuration 4, in a sub-frame n=8, k=3 or 13 is defined for a PHICH and/or a downlink control channel corresponding to a special sub-frame; or in a sub-frame n=9, k=2 or 12 is defined for a PHICH and/or a downlink control channel corresponding to a special sub-frame.

Optionally for a TDD uplink-downlink configuration 5, in a sub-frame n=3, k=8 is defined, in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or in a sub-frame n=9, k=2 or 12 is defined; or for a TDD uplink-downlink configuration 5, in a sub-frame n=8, k=3 or 13 is defined for a PHICH and/or a downlink control channel corresponding to a special sub-frame.

Optionally for a TDD uplink-downlink configuration 6, in a sub-frame n=0 or 5, k=6 or 11 is defined for a PHICH and/or a downlink control channel corresponding to a special sub-frame; or in a sub-frame n=1 or 6, k=5 or 10 is defined for a PHICH and/or a downlink control channel corresponding to a special sub-frame; or in a sub-frame n=9, k=2 or 7 or 12 is defined for a PHICH and/or a downlink control channel corresponding to a special sub-frame.

Optionally the PHICH corresponding to the special sub-frame is a PHICH corresponding to $I_{PHICH}$=2, or a PHICH corresponding to $I_{PHICH}$=1, wherein $I_{PHICH}$ is a parameter for determining a PHICH resource.

Optionally the downlink control channel corresponding to the special sub-frame is a downlink control channel, corresponding to the special sub-frame, determined according to an RNTI or the size of DCI or an indicator in DCI.

An embodiment of the application provides an apparatus for transmitting a PUSCH, the apparatus including:

a determining module configured to decide to transmit a downlink control channel with uplink DCI format, and/or a PHICH, in a sub-frame n; and a transmitting module configured to transmit the downlink control channel with the uplink DCI format, and/or the PHICH, in the sub-frame n to adjust or schedule a UE to transmit a PUSCH in a special sub-frame n+k, wherein k is a predefined value.

Optionally for a TDD uplink-downlink configuration 0, in a sub-frame n=0 or 5, k=6 or 11 is defined for a PHICH and/or a downlink control channel corresponding to a special sub-frame; or in a sub-frame n=1 or 6, k=5 or 10 is defined for a PHICH and/or a downlink control channel corresponding to a special sub-frame.

Optionally the downlink control channel corresponding to the special sub-frame is a downlink control channel, corresponding to the special sub-frame, determined according to a 2-bit uplink (UL) index indicator in the downlink control channel.

Optionally when both an LSB and an MSB in the UL index are set to 0, the downlink control channel corresponds to a PUSCH transmitted in the special sub-frame, and when at least one of the LSB or the MSB in the UL index is set to 1, the downlink control channel corresponds to a PUSCH transmitted in a normal uplink sub-frame.

Optionally for a TDD uplink-downlink configuration 1, in a sub-frame n=0 or 5, k=6 or 11 is defined; or for a TDD uplink-downlink configuration 1, in a sub-frame n=4 or 9, k=2 or 7 or 12 is defined for a PHICH and/or a downlink control channel corresponding to a special sub-frame; or in a sub-frame n=1 or 6, k=5 or 10 is defined for a PHICH and/or a downlink control channel corresponding to a special sub-frame.

Optionally for a TDD uplink-downlink configuration 2, in a sub-frame n=4 or 9, k=2 or 7 or 12 is defined; or in a sub-frame n=0 or 5, k=6 or 11 is defined; or in a sub-frame n=1 or 6, k=5 or 10 is defined; or for a TDD uplink-downlink configuration 2, in a sub-frame n=3 or 8, k=3 or 8 or 13 is defined for a PHICH and/or a downlink control channel corresponding to a special sub-frame.

Optionally for a TDD uplink-downlink configuration 3, in a sub-frame n=7, k=4 is defined; or in a sub-frame n=5, k=6 is defined; or in a sub-frame n=6, k=5 is defined; or in a sub-frame n=1, k=10 is defined; or for a TDD uplink-downlink configuration 3, in a sub-frame n=8, k=3 or 13 is defined for a PHICH and/or a downlink control channel corresponding to a special sub-frame; or in a sub-frame n=9, k=2 or 12 is defined for a PHICH and/or a downlink control channel corresponding to a special sub-frame; or in a sub-frame n=0, k=11 is defined for a PHICH and/or a downlink control channel corresponding to a special sub-frame.

Optionally for a TDD uplink-downlink configuration 4, in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or for a TDD uplink-downlink configuration 4, in a sub-frame n=8, k=3 or 13 is defined for a PHICH and/or a downlink control channel corresponding to a special sub-frame; or in a sub-frame n=9, k=2 or 12 is defined for a PHICH and/or a downlink control channel corresponding to a special sub-frame.

Optionally for a TDD uplink-downlink configuration 5, in a sub-frame n=3, k=8 is defined, in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or in a sub-frame n=9, k=2 or 12 is defined; or for a TDD uplink-downlink configuration 5, in a sub-frame n=8, k=3 or 13 is defined for a PHICH and/or a downlink control channel corresponding to a special sub-frame.

Optionally for a TDD uplink-downlink configuration 6, in a sub-frame n=0 or 5, k=6 or 11 is defined for a PHICH and/or a downlink control channel corresponding to a special sub-frame; or in a sub-frame n=1 or 6, k=5 or 10 is defined for a PHICH and/or a downlink control channel corresponding to a special sub-frame; or in a sub-frame n=9, k=2 or 7 or 12 is defined for a PHICH and/or a downlink control channel corresponding to a special sub-frame.

Optionally the PHICH corresponding to a special sub-frame is a PHICH corresponding to $I_{PHICH}=2$, or a PHICH corresponding to $I_{PHICH}=1$, wherein $I_{PHICH}$ is a parameter for determining a PHICH resource.

Optionally the downlink control channel corresponding to the special sub-frame is a downlink control channel, corresponding to the special sub-frame, determined according to an RNTI or the size of DCI or an indicator in DCI.

An embodiment of the application provides a UE including: a processor, a memory, and a transceiver, wherein:

the processor is configured to read and execute programs in the memory to:

adjust or schedule a PUSCH to be transmitted in a special sub-frame n+k, according to a downlink control channel with an uplink DCI format, and/or a PHICH, detected in a sub-frame n, wherein k is a predefined value; and the transceiver is configured to transmit and receive data under the control of the processor.

An embodiment of the application provides an base station including: a processor, a memory, and a transceiver, wherein:

the processor is configured to read and execute programs in the memory to:

process data as needed for the transceiver; and the transceiver is configured to transmit and receive data under the control of the processor to:

transmit a downlink control channel with an uplink DCI format, and/or a PHICH, in a sub-frame n to adjust or schedule a UE to transmit a PUSCH in a special sub-frame n+k, wherein k is a predefined value.

Advantageous effects of the application are as follows.

In the technical solutions according to the application, a base station transmits a downlink control channel with an uplink DCI format, and/or a PHICH, in a sub-frame n to adjust or schedule a UE to transmit a PUSCH in a special sub-frame n+k, and the UE adjusts or schedules a PUSCH to be transmitted in the special sub-frame n+k according to the downlink control channel with the uplink DCI format, and/or the PHICH, detected in the sub-frame n, where k is a predefined value. The solutions provide a definition of scheduling timing for transmitting a PUSCH in a special sub-frame so as to enable the PUSCH to be transmitted normally in the special sub-frame.

BRIEF DESCRIPTION OF THE DRAWINGS

The drawings to be described below are intended to provide further understanding of the application, and constitute a part of the application, and the exemplary embodiments of the application, and the description thereof are intended to set forth the application, but not to limit the application unduly.

DETAILED DESCRIPTION OF THE EMBODIMENTS

As there is a growing demand for mobile communication services, in order to enable uplink transmission in a TDD special sub-frame, a new TDD special sub-frame configuration has been defined as proposed, for example, a DwPTS of six symbols, a GP of two symbols, and an UpPTS of six symbols; and in the new special sub-frame configuration, the length of the UpPTS is increased, so that a UE can transmit an uplink shared channel, etc., in the UpPTS.

However transmission of a PUSCH in the UpPTS is not supported in the existing LTE system, so scheduling timing of the PUSCH to be transmitted in the UpPTS has not been defined yet, that is, there has been absent a definite solution to scheduling a UE to transmit an uplink shared channel in an UpPTS, and in view of this, the embodiments of the application provide a solution to transmitting a PUSCH so as to enable the PUSCH to be transmitted normally in an UpPTS. Particular embodiments of the application will be described below with reference to the drawings.

In the following description, implementations at the UE and base station sides will be described respectively, and since the implementation at the UE side corresponds to the implementation at the base station side, the implementation at the UE side will be described in details by way of an example, but the implementation at the base station side can readily occur to those skilled in the art according to the implementation at the UE side; and then implementations in which both of them cooperate will be further described for better understanding of the implementations of the solutions according to the embodiments of the application. Such a description shall not suggest that both of them must operate in operation or separately in an implementation, but in fact, problems at the UE and base station sides can also be addressed respectively when the UE and the base station operate separately in an implementation, although a better technical effect can be achieved when both of them interoperate.

Figure 1:
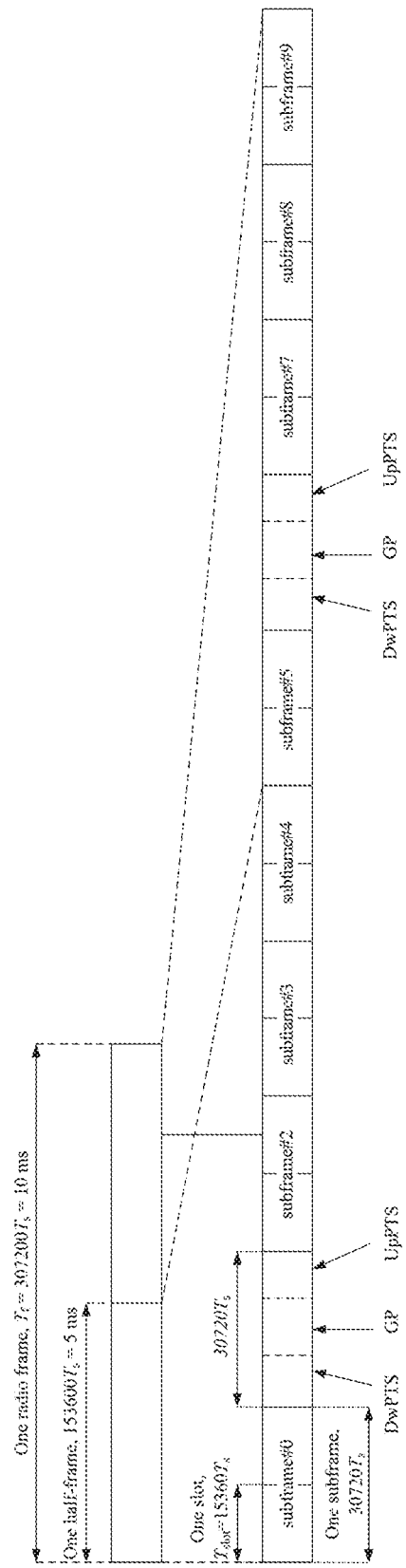
FIG. 1 is a schematic structural diagram of the LTE TDD frame in the prior art.
Figure 2:
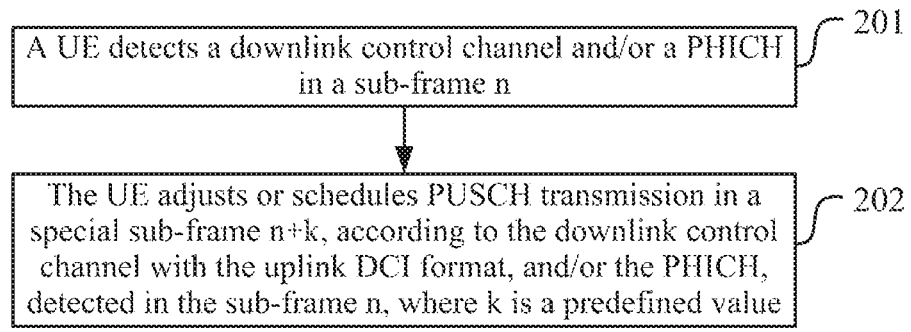
FIG. 2 is a schematic flow chart of a method for transmitting a PUSCH at the UE side according to an embodiment of the application.

FIG. 2 is a schematic flow chart of a method for transmitting a PUSCH at the UE side according to an embodiment of the application, and as illustrated in FIG. 2, the method can include the following operations.

Operation 201: a UE detects a downlink control channel and/or a PHICH in a sub-frame n.

Operation 202: the UE adjusts or schedules PUSCH transmission in a special sub-frame n+k, according to the downlink control channel with an uplink DCI format, and/or the PHICH, detected in the sub-frame n, where k is a predefined value.

A specific implementation will be described below, and a TDD uplink-downlink configuration in the implementation can specifically fall into the following two instances: the TDD uplink-downlink configuration is an uplink reference TDD uplink-downlink configuration, or a TDD uplink-downlink configuration configured in system information, so particularly as follows.

In an implementation, for the TDD uplink-downlink configuration 0, in the sub-frame n=0 or 5, k=6 or 11 is defined for a PHICH and/or a downlink control channel corresponding to a special sub-frame; or in the sub-frame n=1 or 6, k=5 or 10 is defined for a PHICH and/or a downlink control channel corresponding to a special sub-frame.

Particularly for the TDD uplink-downlink configuration 0 (since there are less downlink transmission sub-frames or timeslots than uplink ones, only multi-frame scheduling can be performed, that is, PUSCH transmission at different time positions is scheduled by a downlink control channel and/or a PHICH transmitted in a downlink sub-frame or timeslot, e.g., PUSCH transmission in two different uplink sub-frames is scheduled, or PUSCH transmission in an uplink sub-frame and a special sub-frame is scheduled), in the sub-frame n=0 or 5, k=6 or 11 is defined for a PHICH corresponding to $I_{PHICH}=2$, or a downlink control channel corresponding to an UpPTS (for example, whether a received downlink control channel corresponds to a normal uplink sub-frame or an UpPTS can be determined according to a Radio Network Temporary Identifier (RNTI) or the size of DCI or a corresponding indicator in DCI, and this will also apply hereinafter); or in the sub-frame n=1 or 6, k=5 or 10 is defined for a PHICH corresponding to $I_{PHICH}=1$, or a downlink control channel corresponding to an UpPTS;

| TDD UL/DL | Sub-frame index m | | | | | | | | | |
|---|---|---|---|---|---|---|---|---|---|---|
| Configuration | 0 | 1 | 2 | 3 | 4 | 5 | 6 | 7 | 8 | 9 |
| 0 | 6 or 11 | 5 or 10 | | | | 6 or 11 | 5 or 10 | | | |

Where for the sub-frame indexes defined as 0 and 5, using one definition manner; and for the sub-frame indexes defined as 1 and 6, using one definition manner, and in an implementation, it is feasible to select only one of the definitions, that is, selecting only one of the definitions of k above so that a downlink control channel and/or a PHICH can be transmitted in the sub-frame n to schedule or adjust PUSCH transmission in a special sub-frame n+k.

In an implementation, for the TDD uplink-downlink configuration 1, in the sub-frame n=0 or 5, k=6 or 11 is defined.

Or, for the TDD uplink-downlink configuration 1, in the sub-frame n=4 or 9, k=2 or 7 or 12 is defined for a PHICH and/or a downlink control channel corresponding to a special sub-frame; or in the sub-frame n=1 or 6, k=5 or 10 is defined for a PHICH and/or a downlink control channel corresponding to a special sub-frame.

Particularly for the TDD uplink-downlink configuration 1, there are the following instances.

In a first instance (without multi-frame scheduling), a defined sub-frame for scheduling PUSCH transmission in a special sub-frame is different from a sub-frame for scheduling PUSCH transmission in a normal uplink sub-frame, and in the sub-frame n=0 or 5, k=6 or 11 is defined.

In a second instance (with multi-frame scheduling), a defined sub-frame for scheduling PUSCH transmission in a special sub-frame is the same as a sub-frame for scheduling PUSCH transmission in a normal uplink sub-frame, and in the sub-frame n=4 or 9, k=2 or 7 or 12 is defined for a PHICH corresponding to $I_{PHICH}=1$, or a downlink control channel corresponding to an UpPTS; or in the sub-frame n=1 or 6, k=5 or 10 is defined for a PHICH corresponding to $I_{PHICH}=1$, or a downlink control channel corresponding to an UpPTS;

| TDD UL/DL | Sub-frame index m | | | | | | | | | |
|---|---|---|---|---|---|---|---|---|---|---|
| configuration | 0 | 1 | 2 | 3 | 4 | 5 | 6 | 7 | 8 | 9 |
| 1 | 6 or 11 | 5 or 10 | | | 2 or 7 or 12 | 6 or 11 | 5 or 10 | | | 2 or 7 or 12 |

Where for the sub-frame indexes defined as 0 and 5, using one definition manner; and for the sub-frame indexes defined as 4 or 9, using one definition manner, and in an implementation, it is feasible to select only one of the definitions, that is, selecting only one of the definitions of k above so that a downlink control channel and/or a PHICH can be transmitted in the sub-frame n to schedule or adjust PUSCH transmission in a special sub-frame n+k.

In an implementation, for the TDD uplink-downlink configuration 2, in the sub-frame n=4 or 9, k=2 or 7 or 12 is defined; or in the sub-frame n=0 or 5, k=6 or 11 is defined; or in the sub-frame n=1 or 6, k=5 or 10 is defined.

Or, for the TDD uplink-downlink configuration 2, in the sub-frame n=3 or 8, k=3 or 8 or 13 is defined for a PHICH and/or a downlink control channel corresponding to a special sub-frame.

Particularly for the TDD uplink-downlink configuration 2, there are the following instances.

In a first instance (without multi-frame scheduling), in the sub-frame n=4 or 9, k=2 or 7 or 12 is defined; or in the sub-frame n=0 or 5, k=6 or 11 is defined; or in the sub-frame n=1 or 6, k=5 or 10 is defined.

In a second instance (with multi-frame scheduling), in the sub-frame n=3 or 8, k=3 or 8 or 13 is defined for a PHICH corresponding to $I_{PHICH}=1$, or a downlink control channel corresponding to an UpPTS;

| TDD UL/DL configuration | Sub-frame index m | | | | | | | | | |
|---|---|---|---|---|---|---|---|---|---|---|
| | 0 | 1 | 2 | 3 | 4 | 5 | 6 | 7 | 8 | 9 |
| 2 | | 6 or 11 | 5 or 10 | 3 or 8 or 13 | 2 or 7 or 12 | | 6 or 11 | 5 or 10 | 3 or 8 or 13 | 2 or 7 or 12 |

Where for the sub-frame indexes defined as 0 and 5, using one definition manner; for the sub-frame indexes defined as 1 and 6, using one definition manner; for the sub-frame indexes defined as 3 and 8, using one definition manner, and for the sub-frame indexes defined as 4 or 9, using one definition manner, and in an implementation, it is feasible to select only one of the definitions, that is, selecting only one of the definitions of k above so that a downlink control channel and/or a PHICH can be transmitted in the sub-frame n to schedule or adjust PUSCH transmission in a special sub-frame n+k.

In an implementation, for the TDD uplink-downlink configuration 3, in the sub-frame n=7, k=4 is defined; or in the sub-frame n=5, k=6 is defined; or in the sub-frame n=6, k=5 is defined; or in the sub-frame n=1, k=10 is defined.

Or, for the TDD uplink-downlink configuration 3, in the sub-frame n=8, k=3 or 13 is defined for a PHICH and/or a downlink control channel corresponding to a special sub-frame; or in the sub-frame n=9, k=2 or 12 is defined for a PHICH and/or a downlink control channel corresponding to a special sub-frame; or in the sub-frame n=0, k=11 is defined for a PHICH and/or a downlink control channel corresponding to a special sub-frame.

Particularly for the TDD uplink-downlink configuration 3, there are the following instances.

In a first instance (without multi-frame scheduling), in the sub-frame n=7, k=4; or in the sub-frame n=5, k=6 is defined; or in the sub-frame n=6, k=5 is defined; or in the sub-frame n=1, k=10 is defined.

In a second instance (with multi-frame scheduling), in the sub-frame n=8, k=3 or 13 is defined for a PHICH corresponding to $I_{PHICH}=1$, or a downlink control channel corresponding to an UpPTS; or in the sub-frame n=9, k=2 or 12 is defined for a PHICH corresponding to $I_{PHICH}=1$, or a downlink control channel corresponding to an UpPTS; or in the sub-frame n=0, k=11 is defined for a PHICH corresponding to $I_{PHICH}=1$, or a downlink control channel corresponding to an UpPTS;

| TDD UL/DL configuration | Sub-frame index m | | | | | | | | | |
|---|---|---|---|---|---|---|---|---|---|---|
| | 0 | 1 | 2 | 3 | 4 | 5 | 6 | 7 | 8 | 9 |
| 3 | 11 | 10 | | | | 6 | 5 | 4 | 3 or 13 | 2 or 12 |

Where for the sub-frame index defined as 0, using one definition manner; for the sub-frame index defined as 5, using one definition manner, for the sub-frame index defined as 1, using one definition manner, for the sub-frame index defined as 6, using one definition manner, for the sub-frame index defined as 7, using one definition manner, for the sub-frame index defined as 8, using one definition manner, and for the sub-frame index defined as 9, using one definition manner, and in an implementation, it is feasible to select only one of the definitions, that is, selecting only one of the definitions of k above so that a downlink control channel and/or a PHICH can be transmitted in the sub-frame n to schedule or adjust PUSCH transmission in a special sub-frame n+k.

In an implementation, for the TDD uplink-downlink configuration 4, in the sub-frame n=4, k=7 is defined; or in the sub-frame n=5, k=6 is defined; or in the sub-frame n=6, k=5 is defined; or in the sub-frame n=7, k=4 is defined; or in the sub-frame n=0, k=11 is defined; or in the sub-frame n=1, k=10 is defined.

Or, for the TDD uplink-downlink configuration 4, in the sub-frame n=8, k=3 or 13 is defined for a PHICH and/or a downlink control channel corresponding to a special sub-frame; or in the sub-frame n=9, k=2 or 12 is defined for a PHICH and/or a downlink control channel corresponding to a special sub-frame.

Particularly for the TDD uplink-downlink configuration 4, there are the following instances.

In a first instance (without multi-frame scheduling), in the sub-frame n=4, k=7 is defined; or in the sub-frame n=5, k=6 is defined; or in the sub-frame n=6, k=5 is defined; or in the sub-frame n=7, k=4 is defined; or in the sub-frame n=0, k=11 is defined; or in the sub-frame n=1, k=10 is defined.

In a second instance (with multi-frame scheduling), in the sub-frame n=8, k=3 or 13 is defined for a PHICH corresponding to $I_{PHICH}=1$, or a downlink control channel corresponding to an UpPTS; or in the sub-frame n=9, k=2 or 12 is defined for a PHICH corresponding to $I_{PHICH}=1$, or a downlink control channel corresponding to an UpPTS;

| TDD UL/DL configuration | Sub-frame index m | | | | | | | | | |
|---|---|---|---|---|---|---|---|---|---|---|
| | 0 | 1 | 2 | 3 | 4 | 5 | 6 | 7 | 8 | 9 |
| 4 | 11 | 10 | | | 7 | 6 | 5 | 4 | 3 or 13 | 2 or 12 |

Where for the sub-frame index defined as 0, using one definition manner, for the sub-frame index defined as 5, using one definition manner, for the sub-frame index defined as 1, using one definition manner, for the sub-frame index defined as 6, using one definition manner, for the sub-frame index defined as 4, using one definition manner, for the sub-frame index defined as 7, using one definition manner, for the sub-frame index defined as 8, using one definition manner, and for the sub-frame index defined as 9, using one definition manner, and in an implementation, it is feasible to select only one of the definitions, that is, selecting only one of the definitions of k above so that a downlink control channel and/or a PHICH can be transmitted in the sub-frame n to schedule or adjust PUSCH transmission in a special sub-frame n+k.

In an implementation, for the TDD uplink-downlink configuration 5, in the sub-frame n=3, k=8 is defined, in the sub-frame n=4, k=7 is defined; or in the sub-frame n=5, k=6 is defined; or in the sub-frame n=6, k=5 is defined; or in the sub-frame n=7, k=4 is defined; or in the sub-frame n=0, k=11 is defined; or in the sub-frame n=1, k=10 is defined; or in the sub-frame n=9, k=2 or 12 is defined.

Or, for the TDD uplink-downlink configuration 5, in the sub-frame n=8, k=3 or 13 is defined for a PHICH and/or a downlink control channel corresponding to a special sub-frame.

Particularly for the TDD uplink-downlink configuration 5, there are the following instances.

In a first instance (without multi-frame scheduling), in the sub-frame n=3, k=8 is defined, in the sub-frame n=4, k=7 is defined; or in the sub-frame n=5, k=6 is defined; or in the sub-frame n=6, k=5 is defined; or in the sub-frame n=7, k=4 is defined; or in the sub-frame n=0, k=11 is defined; or in the sub-frame n=1, k=10 is defined; or in the sub-frame n=9, k=2 or 12 is defined.

In a second instance (with multi-frame scheduling), in the sub-frame n=8, k=3 or 13 is defined for a PHICH corresponding to $I_{PHICH}=1$, or a downlink control channel corresponding to an UpPTS:

| TDD UL/DL configuration | Sub-frame index m | | | | | | | | | |
|---|---|---|---|---|---|---|---|---|---|---|
| | 0 | 1 | 2 | 3 | 4 | 5 | 6 | 7 | 8 | 9 |
| 5 | 11 | 10 | | 8 | 7 | 6 | 5 | 4 | 3 or 13 | 2 or 12 |

Where for the sub-frame index defined as 0, using one definition manner, for the sub-frame index defined as 5, using one definition manner, for the sub-frame index defined as 1, using one definition manner, for the sub-frame index defined as 6, using one definition manner, for the sub-frame index defined as 3, using one definition manner, for the sub-frame index defined as 4, using one definition manner, for the sub-frame index defined as 7, using one definition manner, for the sub-frame index defined as 8, using one definition manner, and for the sub-frame index defined as 9, using one definition manner, and in an implementation, it is feasible to select only one of the definitions, that is, selecting only one of the definitions of k above so that a downlink control channel and/or a PHICH can be transmitted in the sub-frame n to schedule or adjust PUSCH transmission in a special sub-frame n+k.

In an implementation, for the TDD uplink-downlink configuration 6, in the sub-frame n=0 or 5, k=6 or 11 is defined for a PHICH and/or a downlink control channel corresponding to a special sub-frame; or in the sub-frame n=1 or 6, k=5 or 10 is defined for a PHICH and/or a downlink control channel corresponding to a special sub-frame; or in the sub-frame n=9, k=2 or 7 or 12 is defined for a PHICH and/or a downlink control channel corresponding to a special sub-frame.

Specifically, for the TDD uplink-downlink configuration 6 (only with multi-scheduling for the same reason as the configuration 0), in the sub-frame n=0 or 5, k=6 or 11 is defined for a PHICH corresponding to $I_{PHICH}=1$, or a downlink control channel corresponding to an UpPTS; or in the sub-frame n=1 or 6, k=5 or 10 is defined for a PHICH corresponding to $I_{PHICH}=1$, or a downlink control channel corresponding to an UpPTS; or in the sub-frame n=9, k=2 or 7 or 12 is defined for a PHICH corresponding to $I_{PHICH}=1$, or a downlink control channel corresponding to an UpPTS;

| TDD UL/DL configuration | Sub-frame index m | | | | | | | | | |
|---|---|---|---|---|---|---|---|---|---|---|
| | 0 | 1 | 2 | 3 | 4 | 5 | 6 | 7 | 8 | 9 |
| 6 | 6 or 11 | 5 or 10 | | | | 6 or 11 | 5 or 10 | | | 2 or 7 or 12 |

Where for the sub-frame indexes defined as 0 and 5, using one definition manner, for the sub-frame indexes defined as 1 and 6, using one definition manner, for the sub-frame index defined as 9, using one definition manner, for the sub-frame indexes defined as 0 and 9, using one definition manner, for the sub-frame indexes defined as 1 and 9, using one definition manner, for the sub-frame indexes defined as 5 and 9, using one definition manner, and for the sub-frame indexes defined as 6 and 9, using one definition manner, and in an implementation, it is feasible to select only one of the definitions, that is, selecting only one of the definitions of k above so that a downlink control channel and/or a PHICH can be transmitted in the sub-frame n to schedule or adjust PUSCH transmission in a special sub-frame n+k.

In an implementation, the PHICH corresponding to the special sub-frame can be a PHICH corresponding to $I_{PHICH}=2$, or a PHICH corresponding to $I_{PHICH}=1$, where $I_{PHICH}$ is a parameter for determining a PHICH resource.

In an implementation, the downlink control channel corresponding to the special sub-frame can be a downlink control channel, corresponding to the special sub-frame, determined according to an RNTI or the size of DCI or an indicator in DCI.

Particularly when there are both a downlink control channel, with an uplink DCI format, scheduling a PUSCH to be transmitted in a special sub-frame, and a downlink control channel, with an uplink DCI format, scheduling a PUSCH to be transmitted in a normal uplink sub-frame, in the sub-frame n, particularly implemented as follows.

In an implementation A, whether scheduling information corresponds to an UpPTS or a normal uplink sub-frame is determined according to the size of the uplink DCI format, that is, the size of the uplink DCI format corresponding to the UpPTS is different from the size of the uplink DCI format corresponding to the normal uplink sub-frame: and for example, in a possible implementation, for a UE supporting transmission of a PUSCH in an UpPTS, an uplink DCI format corresponding to an UpPTS is a newly defined uplink DCI format, or an uplink DCI format obtained by adding an additional bit field to an existing uplink DCI format, and an uplink DCI format corresponding to a normal uplink sub-frame is the existing uplink DCI format, where the existing uplink DCI format can be the DCI format 0/4 defined in the 3GPP 36.212 Rel-13 and the earlier releases.

Or, in an implementation B, whether scheduling information corresponds to an UpPTS or a normal uplink sub-frame is determined according to a specific indicator in the uplink DCI format, that is, when the specific indicator is "1", it indicates a downlink control channel corresponding to an UpPTS, and when the specific indicator is "0", it indicates a downlink control channel corresponding to a normal uplink sub-frame, and vice versa; or a process index is indicated in the specific indicator, and the process index can be a common index of a PUSCH in the UpPTS, and a PUSCH in the normal sub-frame, or a PUSCH in the UpPTS, and a PUSCH in the normal sub-frame can be indexed separately.

For example, in a possible implementation, for a UE supporting transmission of a PUSCH in an UpPTS, a padding bit(s) in an existing uplink DCI format are reused as the specific indicator, that is, for the UE supporting transmission of a PUSCH in an UpPTS, uplink DCI formats corresponding to an UpPTS and a normal uplink sub-frame are the same, and have the same size here, and one or more padding bits therein are parsed as the specific indicator, so that it can be determined whether the uplink DCI corresponds to an UpPTS or a normal uplink sub-frame.

In another possible implementation, an uplink DCI format A is defined for a UE supporting transmission of a PUSCH in an UpPTS, and the uplink DCI format A can be an existing uplink DCI format to which an additional indicator is added; and for example, an additional indicator is added to the DCI format 0/4, and the indicator is only valid to a UE supporting transmission of a PUSCH in an UpPTS, or is a totally redefined uplink DCI format, and the UE supporting transmission of a PUSCH in an UpPTS schedules both of a PUSCH to be transmitted in an UpPTS and a PUSCH to be transmitted in a normal uplink sub-frame, with the uplink DCI format A. For a UE supporting transmission of a PUSCH in an UpPTS, it can be further defined that a part or all of downlink DCI formats thereof are padded according to the size of the uplink DCI format A, or the uplink DCI format A is padded according to the size of a part or all of downlink DCI formats thereof, so that the size of the uplink DCI format A is the same as the size of a part or all of the downlink DCI formats, so the number of blind detections of DCI by the UE will not be increased. For example, for a UE supporting transmission of a PUSCH in an UpPTS, an uplink DCI format thereof is defined based upon the existing DCI format 0, and at least a 1-bit indicator is added to the existing DCI format 0 to indicate whether to schedule a PUSCH to be transmitted in a normal uplink sub-frame, or to schedule a PUSCH to be transmitted in an UpPTS, using the DCI format, and of course, another indicator(s), e.g., an HARQ process index indicator, etc., may be further added; and the uplink DCI format 0 to which the indicator(s) is added is the uplink DCI format 0 corresponding to the UE supporting transmission of a PUSCH in an UpPTS. Since the uplink DCI format 0 was originally designed to be of the same size as the downlink DCI format 1A to thereby reduce the number of blind detections, in order to maintain the original number of blind detections, when the size of the uplink DCI format 0 corresponding to the UE supporting transmission of a PUSCH in an UpPTS is less than that of the downlink DCI format 1A, the DCI format 0 corresponding to the UE supporting transmission of a PUSCH in an UpPTS can be padded so that the DCI size thereof is the same as that of the corresponding downlink DCI format 1A thereof, and when the size of the downlink DCI format 1A corresponding to the UE supporting transmission of a PUSCH in an UpPTS is less than that of the uplink DCI format 0 thereof, the DCI format 1A corresponding to the UE supporting transmission of a PUSCH in an UpPTS can be padded so that the DCI size thereof is the same as that of the corresponding uplink DCI format 0 thereof, where for the downlink DCI format corresponding to the UE supporting transmission of a PUSCH in an UpPTS. e.g., the DCI format 1A, or another downlink DCI format, e.g., the DCI format 1B/1C/1D/2/2A/2B, an existing downlink DCI format can be reused directly, and in order to maintain the number of blind detections, the sizes of the downlink DCI formats 3 and 3A corresponding to the UE supporting transmission of a PUSCH in an UpPTS are the same as the sizes of the uplink DCI format 0 and the downlink DCI format 1A corresponding to the UE supporting transmission of a PUSCH in an UpPTS.

Or, in an implementation C, whether scheduling information corresponds to an UpPTS or a normal uplink sub-frame is determined according to an RNTI for the downlink control channel, that is, an RNTI corresponding to a downlink control channel corresponding to an UpPTS is different from an RNTI corresponding to a downlink control channel corresponding to a normal uplink sub-frame, and the downlink control channel is scrambled using the RNTI. For example, in a possible implementation, a UE supporting transmission of a PUSCH in an UpPTS schedules a PUSCH to be transmitted in an UpPTS, with the same uplink DCI format as an uplink DCI format in which the UE schedules a PUSCH to be transmitted in a normal uplink sub-frame, and for example, an existing uplink DCI format can be reused, or an uplink DCI format can be newly defined. Of course, a different uplink DCI format can also be used.

In an implementation, the downlink control channel corresponding to a special sub-frame can alternatively be a downlink control channel, corresponding to a special sub-frame, determined according to a 2-bit uplink (UL) index indicator in the downlink control channel.

Particularly the UE determines whether the downlink control channel corresponds to a PUSCH transmitted in a special sub-frame, according to the 2-bit uplink (UL) index indicator in the downlink control channel; and when both the Least Significant Bit (LSB) and the Most Significant Bit (MSB) in the UL index are set to 0, the downlink control channel corresponds to a PUSCH transmitted in a special sub-frame, and when at least one of the LSB or the MSB in the UL index is 1, the downlink control channel corresponds to a PUSCH transmitted in a normal uplink sub-frame.

In an implementation, for the TDD uplink-downlink configuration 0, a 2-bit uplink (UL) index indicator in an existing uplink DCI format can be used to determine whether a downlink control channel with the uplink DCI format corresponds to a PUSCH in a normal uplink sub-frame, or a PUSCH in a special sub-frame, and when both of the bits in the UL index are 0, that is, both the LSB and the MSB are set to 0, it indicates that the downlink control channel corresponds to a PUSCH transmitted in a special sub-frame; and when at least one bit of the LSB or the MSB is 1, it indicates that the downlink control channel corresponds to a PUSCH transmitted in a normal uplink sub-frame. Stated otherwise, in an implementation, the downlink control channel corresponding to a special sub-frame can be a downlink control channel, corresponding to a special sub-frame, determined according to the 2-bit uplink (UL) index indicator in the downlink control channel.

In a particular implementation, when both the LSB and the MSB in the UL index are set to 0, the downlink control channel corresponds to a PUSCH transmitted in a special sub-frame, and when at least one of the LSB or the MSB in the UL index is set to 1, the downlink control channel corresponds to a PUSCH transmitted in a normal uplink sub-frame.

For example, in the scheduling timing as defined above, for the TDD uplink-downlink configuration 0, the UE detects a downlink control channel with an uplink DCI format in the sub-frame n, and adjusts or schedules PUSCH transmission in the special sub-frame n+k, and for example, k=6 when n=0 or 5, that is, the UE detects a downlink control channel with an uplink DCI format in the sub-frame 0, and adjusts or schedules a PUSCH to be transmitted in the special sub-frame 6: and in the scheduling timing of a PUSCH in a normal uplink sub-frame, depicted in Table 4, as defined in the prior art, and the scheduling timing of n+6 as defined in the prior art (when MSB=1, the sub-frame n+k is scheduled in the sub-frame 0, and when LSB=1, the sub-frame n+7 is scheduled in the sub-frame 0), the UE detects a downlink control channel with an uplink DCI format in the sub-frame 0, and adjusts or schedules a PUSCH to be transmitted in the sub-frame 4 (in the scheduling timing with n+k, where k is 4 as depicted in Table 4) and/or the uplink sub-frame 7 (in the scheduling timing with n+7), that is, the UE detects a downlink control channel with an uplink DCI format in the sub-frame 0, and can adjust or schedule both a PUSCH to be transmitted in the special sub-frame 6, and a PUSCH to be transmitted in the uplink sub-frame 4 or the uplink sub-frame 7, so in order for the UE to detect a downlink control channel in the sub-frame 0, in an implementation, the UE can detect a downlink control channel with an uplink DCI format as defined in the prior art, and determine whether a PUSCH to be adjusted or scheduled corresponding to the downlink control channel is a PUSCH to be transmitted in the special sub-frame 6, or a PUSCH to be transmitted in the uplink sub-frame 4 and/or the uplink sub-frame 7, according to setting of the 2-bit UL index indicator in the downlink control channel: and particularly when both the LSB and the MSB in the UL index are 0, the UE determines that the downlink control channel is used to adjust or schedule a PUSCH to be transmitted in the special sub-frame 6, and when either of the LSB and the MSB in the UL index is 1, the UE determines that the downlink control channel is used to adjust or schedule a PUSCH to be transmitted in a normal uplink sub-frame. Particularly when the LSB in the UL index is 1, the UE determines that the downlink control channel is used to adjust or schedule a PUSCH to be transmitted in the uplink sub-frame 7; when the MSB in the UL index is 1, the UE determines that the downlink control channel is used to adjust or schedule a PUSCH to be transmitted in the uplink sub-frame 4; and when both of the LSB and the MSB in the UL index are 1, the UE determines that the downlink control channel is used to adjust or schedule a PUSCH to be transmitted in the uplink sub-frames 4 and 7. When n=5, and k=6, that is, the UE detects a downlink control channel with an uplink DCI format in the sub-frame 5, and adjusts or schedules a PUSCH to be transmitted in the special sub-frame 1 (in a next radio frame), the same process as described above will apply.

In another example, in the scheduling timing as defined above, for the TDD uplink-downlink configuration 0, the UE detects a downlink control channel with an uplink DCI format in the sub-frame n, and adjusts or schedules PUSCH transmission in the special sub-frame n+k, and for example, k=5 when n=1 or 6, that is, the UE detects a downlink control channel with an uplink DCI format in the sub-frame 1, and adjusts or schedules a PUSCH to be transmitted in the special sub-frame 6; and in the scheduling timing of a PUSCH in a normal uplink sub-frame, depicted in Table 4, as defined in the prior art, and the scheduling timing of n+6 as defined in the prior art (when MSB=1, the sub-frame n+k is scheduled in the sub-frame 1, and when LSB=1, the sub-frame n+7 is scheduled in the sub-frame 1), the UE detects a downlink control channel with an uplink DCI format in the sub-frame 1, and adjusts or schedules a PUSCH to be transmitted in the sub-frame 7 (in the scheduling timing with n+k, where k is 6 as depicted in Table 4) and/or the uplink sub-frame 8 (in the scheduling timing with n+7), that is, the UE detects a downlink control channel with an uplink DCI format in the sub-frame 1, and can adjust or schedule both a PUSCH to be transmitted in the special sub-frame 6, and a PUSCH to be transmitted in the uplink sub-frame 7 or the uplink sub-frame 8, so in order for the UE to detect a downlink control channel in the sub-frame 1, in an implementation, the UE can detect a downlink control channel with an uplink DCI format as defined in the prior art, and determine whether a PUSCH to be adjusted or scheduled corresponding to the downlink control channel is a PUSCH to be transmitted in the special sub-frame 6, or a PUSCH to be transmitted in the uplink sub-frame 7 and/or the uplink sub-frame 8, according to setting of the 2-bit UL index indicator in the downlink control channel; and particularly when both the LSB and the MSB in the UL index are 0, the UE determines that the downlink control channel is used to adjust or schedule a PUSCH to be transmitted in the special sub-frame 6, and when either of the LSB and the MSB in the UL index is 1, the UE determines that the downlink control channel is used to adjust or schedule a PUSCH to be transmitted in a normal uplink sub-frame. Particularly when the LSB in the UL index is 1, the UE determines that the downlink control channel is used to adjust or schedule a PUSCH to be transmitted in the uplink sub-frame 8: when the MSB in the UL index is 1, the UE determines that the downlink control channel is used to adjust or schedule a PUSCH to be transmitted in the uplink sub-frame 7; and when both of the LSB and the MSB in the UL index are 1, the UE determines that the downlink control channel is used to adjust or schedule a PUSCH to be transmitted in the uplink sub-frames 7 and 8. When n=5, and k=6, that is, the UE detects a downlink control channel with an uplink DCI format in the sub-frame 6, and adjusts or schedules a PUSCH to be transmitted in the special sub-frame 1 (in a next radio frame), the same process as described above will apply.

In an implementation, when implementing multi-frame scheduling, the values above of k are only defined for a special sub-frame, and in a sub-frame n, if there is also a PUSCH to be scheduled and transmitted in a normal sub-frame n+m, then m will be defined as in the existing protocol (in the scheduling timing as defined in Table 4). Particularly when there are both a downlink control channel with an uplink DCI format, and/or a PHICH, for scheduling a PUSCH to be transmitted in a special sub-frame, and a downlink control channel with an uplink DCI format, and/or a PHICH, for scheduling a PUSCH to be transmitted in a normal uplink sub-frame, in the sub-frame n, particularly as follows.

If it is determined that a downlink control channel and/or a PHICH corresponding to an UpPTS is detected, then a transmission sub-frame of a target PUSCH will be determined according to the scheduling timing of the UpPTS above; and if it is determined that a downlink control channel and/or a PHICH corresponding to a normal uplink sub-frame is detected, then a scheduling relationship will be determined according to a scheduling mechanism in the existing protocol (in the scheduling timing as defined in Table 4).

In correspondence to the UE side, a method for transmitting a PUSCH at the base station side in an implementation can include the following operations.

A base station transmits a downlink control channel with an uplink DCI format, and/or a PHICH, in a sub-frame n to adjust or schedule a UE to transmit a PUSCH in a special sub-frame n+k, where k is a predefined value.

In an implementation, for the TDD uplink-downlink configuration 0, in the sub-frame n=0 or 5, k=6 or 11 is defined for a PHICH and/or a downlink control channel corresponding to a special sub-frame; or in the sub-frame n=1 or 6, k=5 or 10 is defined for a PHICH and/or a downlink control channel corresponding to a special sub-frame.

In an implementation, for the TDD uplink-downlink configuration 1, in the sub-frame n=0 or 5, k=6 or 11 is defined.

Or, for the TDD uplink-downlink configuration 1, in the sub-frame n=4 or 9, k=2 or 7 or 12 is defined for a PHICH and/or a downlink control channel corresponding to a special sub-frame; or in the sub-frame n=1 or 6, k=5 or 10 is defined for a PHICH and/or a downlink control channel corresponding to a special sub-frame.

In an implementation, for the TDD uplink-downlink configuration 2, in the sub-frame n=4 or 9, k=2 or 7 or 12 is defined; or in the sub-frame n=0 or 5, k=6 or 11 is defined; or in the sub-frame n=1 or 6, k=5 or 10 is defined.

Or, for the TDD uplink-downlink configuration 2, in the sub-frame n=3 or 8, k=3 or 8 or 13 is defined for a PHICH and/or a downlink control channel corresponding to a special sub-frame.

In an implementation, for the TDD uplink-downlink configuration 3, in the sub-frame n=7, k=4 is defined; or in the sub-frame n=5, k=6 is defined; or in the sub-frame n=6, k=5 is defined; or in the sub-frame n=1, k=10 is defined.

Or, for the TDD uplink-downlink configuration 3, in the sub-frame n=8, k=3 or 13 is defined for a PHICH and/or a downlink control channel corresponding to a special sub-frame; or in the sub-frame n=9, k=2 or 12 is defined for a PHICH and/or a downlink control channel corresponding to a special sub-frame; or in the sub-frame n=0, k=11 is defined for a PHICH and/or a downlink control channel corresponding to a special sub-frame.

In an implementation, for the TDD uplink-downlink configuration 4, in the sub-frame n=4, k=7 is defined; or in the sub-frame n=5, k=6 is defined; or in the sub-frame n=6, k=5 is defined; or in the sub-frame n=7, k=4 is defined; or in the sub-frame n=0, k=11 is defined; or in the sub-frame n=1, k=10 is defined.

Or, for the TDD uplink-downlink configuration 4, in the sub-frame n=8, k=3 or 13 is defined for a PHICH and/or a downlink control channel corresponding to a special sub-frame; or in the sub-frame n=9, k=2 or 12 is defined for a PHICH and/or a downlink control channel corresponding to a special sub-frame.

In an implementation, for the TDD uplink-downlink configuration 5, in the sub-frame n=3, k=8 is defined, in the sub-frame n=4, k=7 is defined; or in the sub-frame n=5, k=6 is defined; or in the sub-frame n=6, k=5 is defined; or in the sub-frame n=7, k=4 is defined; or in the sub-frame n=0, k=11 is defined; or in the sub-frame n=1, k=10 is defined; or in the sub-frame n=9, k=2 or 12 is defined.

Or, for the TDD uplink-downlink configuration 5, in the sub-frame n=8, k=3 or 13 is defined for a PHICH and/or a downlink control channel corresponding to a special sub-frame.

In an implementation, for the TDD uplink-downlink configuration 6, in the sub-frame n=0 or 5, k=6 or 11 is defined for a PHICH and/or a downlink control channel corresponding to a special sub-frame; or in the sub-frame n=1 or 6, k=5 or 10 is defined for a PHICH and/or a downlink control channel corresponding to a special sub-frame; or in the sub-frame n=9, k=2 or 7 or 12 is defined for a PHICH and/or a downlink control channel corresponding to a special sub-frame.

In an implementation, the PHICH corresponding to a special sub-frame can be a PHICH corresponding to $I_{PHICH}=2$, or a PHICH corresponding to $I_{PHICH}=1$, where $I_{PHICH}$ is a parameter for determining a PHICH resource.

In an implementation, the downlink control channel corresponding to a special sub-frame can be a downlink control channel, corresponding to a special sub-frame, determined according to an RNTI or the size of DCI or an indicator in DCI.

The application will be further described below by way of a particular example.

First Embodiment

For the TDD uplink-downlink configuration 1, it can be only defined that a UE only needs to detect a downlink control channel and/or a PHICH corresponding to a PUSCH transmitted in an UpPTS, in the sub-frame 0 and the sub-frame 5, and at this time, there is no scheduling information of a normal uplink sub-frame, but only scheduling information of an UpPTS in the sub-frame 0 and the sub-frame 5, so whether scheduling information corresponds to an UpPTS or a normal uplink sub-frame can be determined according to a sub-frame in which a downlink control channel and/or a PHICH is received, to thereby select a corresponding definition of scheduling timing (i.e., a definition of k); and at this time, a DCI size corresponding to an UpPTS may not agree with an existing uplink DCI format, but may be redesigned, or may be an existing uplink DCI format.

If a downlink control channel with an uplink DCI format, and/or a PHICH is detected in the sub-frame 0, then the UE will operate in the scheduling timing defined for an UpPTS: the UE adjusts PUSCH transmission in an UpPTS in the sub-frame n+k=6 according to information in the downlink control channel and/or the PHICH, that is, if only a PHICH is received, then if the PHICH carries NACK, then it will indicate that a PUSCH in a preceding UpPTS (e.g., an UpPTS in the sub-frame 6 in a preceding radio frame) has failed to be transmitted, and shall be retransmitted, so the UE retransmits the PUSCH in the UpPTS in the sub-frame 6 according to scheduling information of the PUSCH in the preceding UpPTS; and if both a PHICH, and a downlink control channel with an uplink DCI format are received, then reference will be made to information in the downlink control channel, and if an NDI in the downlink control channel is not inverted from (that is, the value thereof is the same as that of) an NDI corresponding to PUSCH transmission in a preceding UpPTS (e.g., an UpPTS in the sub-frame 6 in a preceding radio frame), then the UE will determine that a PUSCH in the preceding UpPTS sub-frame 1 shall be retransmitted, and retransmit the PUSCH in the UpPTS in the sub-frame 6 according to new scheduling information in a downlink control channel received in the sub-frame 0 (the scheduling information may indicate a different frequency resource, modulation and coding level, etc., of PUSCH transmission from those of initial transmission). If an NDI in the downlink control channel is inverted from (that is, the value thereof is different from that of) an NDI corresponding to PUSCH transmission in a preceding UpPTS (e.g., an UpPTS in the sub-frame 6 in a preceding radio frame), then it will indicate that the downlink control channel schedules initial transmission of a new PUSCH, and a PUSCH in the preceding UpPTS has been transmitted successfully, so the UE transmits the new PUSCH in the UpPTS in the sub-frame 6 according to new scheduling information in the downlink control channel.

If a downlink control channel with an uplink DCI format, and/or a PHICH is detected in the sub-frame 5, then accordingly the UE will schedule or adjust transmission of a PUSCH in an UpPTS in the sub-frame 1 in a next radio frame in the same process as described above.

If a downlink control channel with an uplink DCI format, and/or a PHICH is detected in the sub-frame 1 or 6, then the UE will determine that the sub-frame corresponds to a normal uplink sub-frame, so the UE determines whether PUSCH transmission in the sub-frame 7 (received in the sub-frame 1) or the sub-frame 2 in a next radio frame (received in the sub-frame 6) is to be scheduled or adjusted, according to the scheduling timing as defined in Table 4.

Second Embodiment

For the TDD uplink-downlink configuration 1, it can be only defined that a UE only needs to detect a downlink control channel and/or a PHICH corresponding to a PUSCH transmitted in an UpPTS, in the sub-frame 1 and the sub-frame 6, and at this time, scheduling information of a normal sub-frame may be existed in sub-frame 1 and the sub-frame 6. Therefore, there is scheduling information of PUSCHs to be transmitted in a plurality of sub-frames, in the sub-frame 1 and the sub-frame 6. For a downlink control channel with an uplink DCI format transmitted in the sub-frame 1 or 6, whether scheduling information corresponds to an UpPTS or a normal uplink sub-frame can be determined according to a DCI size of the downlink control channel, or an indicator in DCI, or an RNTI in use: and for a PHICH, whether scheduling information corresponds to an UpPTS or a normal uplink sub-frame can be determined according to a value of $I_{PHICH}$ corresponding to a PHICH resource, so that a corresponding definition of scheduling timing (i.e., a definition of k) is selected.

When a downlink control channel with an uplink DCI format, and/or a PHICH is detected in the sub-frame 1, there are the following instances.

If it is determined that scheduling information corresponds to an UpPTS, according to a DCI size for the downlink control channel, or an indicator in DCI, or an RNTI in use, and/or the PHICH is detected over a PHICH resource with $I_{PHICH}=1$, so it is determined that the PHICH corresponds to an UpPTS, then the UE will adjust PUSCH transmission in an UpPTS in the sub-frame n+k=6 according to information in the detected downlink control channel and/or PHICH as per a definition of PUSCH scheduling timing for an UpPTS, that is, if only the PHICH is received, then if the PHICH carries NACK, then it will indicate that a PUSCH in a preceding UpPTS (e.g., an UpPTS in the sub-frame 6 in a preceding radio frame) has failed to be transmitted, and shall be retransmitted, so the UE retransmits the PUSCH in the UpPTS in the sub-frame 6 according to scheduling information of the PUSCH in the preceding UpPTS; and if both the PHICH, and a downlink control channel with an uplink DCI format are received, then reference will be made to information in the downlink control channel, and if an NDI in the downlink control channel is not inverted from (that is, the value thereof is the same as that of) an NDI corresponding to PUSCH transmission in a preceding UpPTS (e.g., an UpPTS in the sub-frame 6 in a preceding radio frame), then the UE will determine that a PUSCH in the preceding UpPTS sub-frame 1 shall be retransmitted, and retransmit the PUSCH in the UpPTS in the sub-frame 6 according to new scheduling information in a downlink control channel received in the sub-frame 0 (the scheduling information may indicate a different frequency resource, modulation and coding level, etc., of PUSCH transmission from those of initial transmission). If an NDI in the downlink control channel is inverted from (that is, the value thereof is different from that of) an NDI corresponding to PUSCH transmission in a preceding UpPTS (e.g., an UpPTS in the sub-frame 6 in a preceding radio frame), then it will indicate that the downlink control channel schedules initial transmission of a new PUSCH, and a PUSCH in the preceding UpPTS has been transmitted successfully, so the UE transmits the new PUSCH in the UpPTS in the sub-frame 6 according to new scheduling information in the downlink control channel.

If it is determined that scheduling information corresponds to a normal uplink sub-frame, according to a DCI size for the downlink control channel, or an indicator in DCI, or an RNTI in use, and/or the PHICH is detected over a PHICH resource with $I_{PHICH}=0$, so it is determined that the PHICH corresponds to a normal uplink sub-frame, then the UE will adjust PUSCH transmission in an UpPTS in the sub-frame n+k=7 according to information in the detected downlink control channel and/or PHICH as per a definition of PUSCH scheduling timing in a normal uplink sub-frame, i.e., as defined in Table 4, and particularly the UE can adjust it according to the PHICH and/or the downlink control channel in substantially the same process as described above.

If a downlink control channel with an uplink DCI format, and/or a PHICH is detected in the sub-frame 6, then accordingly the UE will operate in substantially the same process as in the sub-frame 1.

It shall be noted that for the TDD uplink-downlink configuration 0, in the sub-frame 0/1/5/6, if it is determined that a downlink control channel and/or a PHICH corresponding to an UpPTS is detected, then a transmission sub-frame of a target PUSCH will be determined according to scheduling timing of the UpPTS: and if it is determined that a downlink control channel and/or a PHICH corresponding to a normal uplink sub-frame is detected, then a scheduling relationship will be determined according to a scheduling mechanism in the existing protocol, and for example, it is determined that corresponding PUSCH transmission in the sub-frame n+k and/or n+7 is scheduled by the downlink control channel, according to information states of upper and lower bits in an UL index in the downlink control channel, and it is determined that PUSCH retransmission in the sub-frame n+k and/or n+7 is scheduled by the PHICH, according to $I_{PHICH}=0$ or 1 corresponding to the PHICH.

Based upon the same inventive idea, embodiments of the application further provide apparatuses for transmitting a PUSCH, and since these apparatuses address the problem under a similar principle to the methods above for transmitting a PUSCH, reference can be made to the implementations of the methods for implementations of these apparatuses, and a repeated description thereof will be omitted here.

Figure 3:
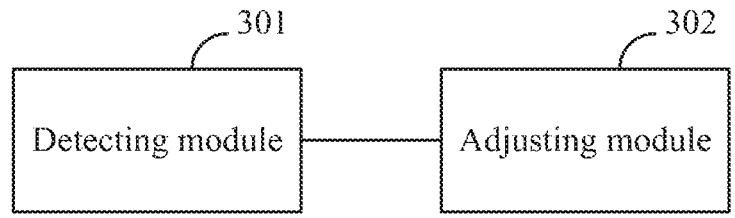
FIG. 3 is a schematic structural diagram of an apparatus for transmitting a PSUCH at a terminal side according to an embodiment of the application.

FIG. 3 is a schematic structural diagram of an apparatus for transmitting a PUSCH at a UE side according to an embodiment of the application, and as illustrated, the apparatus includes: a detecting module 301 configured to detect a downlink control channel and/or a PHICH in a sub-frame n; and an adjusting module 302 configured to adjust or schedule PUSCH transmission in a special sub-frame n+k, according to the downlink control channel with the uplink DCI format, and/or the PHICH, detected in the sub-frame n, where k is a predefined value.

In an implementation, for the TDD uplink-downlink configuration 0, in the sub-frame n=0 or 5, k=6 or 11 is defined for a PHICH and/or a downlink control channel corresponding to a special sub-frame; or in the sub-frame n=1 or 6, k=5 or 10 is defined for a PHICH and/or a downlink control channel corresponding to a special sub-frame.

In an implementation, the downlink control channel corresponding to a special sub-frame is a downlink control channel, corresponding to a special sub-frame, determined according to a 2-bit uplink (UL) index indicator in the downlink control channel.

In an implementation: when both an LSB and an MSB in the UL index are set to 0, the downlink control channel corresponds to a PUSCH transmitted in a special sub-frame, and when at least one of the LSB or the MSB in the UL index is set to 1, the downlink control channel corresponds to a PUSCH transmitted in a normal uplink sub-frame.

In an implementation, for the TDD uplink-downlink configuration 1, in the sub-frame n=0 or 5, k=6 or 11 is defined.

Or, for the TDD uplink-downlink configuration 1, in the sub-frame n=4 or 9, k=2 or 7 or 12 is defined for a PHICH and/or a downlink control channel corresponding to a special sub-frame; or in the sub-frame n=1 or 6, k=5 or 10 is defined for a PHICH and/or a downlink control channel corresponding to a special sub-frame.

In an implementation, for the TDD uplink-downlink configuration 2, in the sub-frame n=4 or 9, k=2 or 7 or 12 is defined; or in the sub-frame n=0 or 5, k=6 or 11 is defined; or in the sub-frame n=1 or 6, k=5 or 10 is defined.

Or, for the TDD uplink-downlink configuration 2, in the sub-frame n=3 or 8, k=3 or 8 or 13 is defined for a PHICH and/or a downlink control channel corresponding to a special sub-frame.

In an implementation, for the TDD uplink-downlink configuration 3, in the sub-frame n=7, k=4 is defined; or in the sub-frame n=5, k=6 is defined; or in the sub-frame n=6, k=5 is defined; or in the sub-frame n=, k=10 is defined.

Or, for the TDD uplink-downlink configuration 3, in the sub-frame n=8, k=3 or 13 is defined for a PHICH and/or a downlink control channel corresponding to a special sub-frame; or in the sub-frame n=9, k=2 or 12 is defined for a PHICH and/or a downlink control channel corresponding to a special sub-frame; or in the sub-frame n=0, k=11 is defined for a PHICH and/or a downlink control channel corresponding to a special sub-frame.

In an implementation, for the TDD uplink-downlink configuration 4, in the sub-frame n=4, k=7 is defined; or in the sub-frame n=5, k=6 is defined; or in the sub-frame n=6, k=5 is defined; or in the sub-frame n=7, k=4 is defined; or in the sub-frame n=0, k=11 is defined; or in the sub-frame n=1, k=10 is defined.

Or, for the TDD uplink-downlink configuration 4, in the sub-frame n=8, k=3 or 13 is defined for a PHICH and/or a downlink control channel corresponding to a special sub-frame; or in the sub-frame n=9, k=2 or 12 is defined for a PHICH and/or a downlink control channel corresponding to a special sub-frame.

In an implementation, for the TDD uplink-downlink configuration 5, in the sub-frame n=3, k=8 is defined, in the sub-frame n=4, k=7 is defined; or in the sub-frame n=5, k=6 is defined; or in the sub-frame n=6, k=5 is defined; or in the sub-frame n=7, k=4 is defined; or in the sub-frame n=0, k=11 is defined; or in the sub-frame n=1, k=10 is defined; or in the sub-frame n=9, k=2 or 12 is defined.

Or, for the TDD uplink-downlink configuration 5, in the sub-frame n=8, k=3 or 13 is defined for a PHICH and/or a downlink control channel corresponding to a special sub-frame.

In an implementation, for the TDD uplink-downlink configuration 6, in the sub-frame n=0 or 5, k=6 or 11 is defined for a PHICH and/or a downlink control channel corresponding to a special sub-frame; or in the sub-frame n=1 or 6, k=5 or 10 is defined for a PHICH and/or a downlink control channel corresponding to a special sub-frame; or in the sub-frame n=9, k=2 or 7 or 12 is defined for a PHICH and/or a downlink control channel corresponding to a special sub-frame.

In an implementation, the PHICH corresponding to a special sub-frame can be a PHICH corresponding to $I_{PHICH}=2$, or a PHICH corresponding to $I_{PHICH}=1$, where $I_{PHICH}$ is a parameter for determining a PHICH resource.

In an implementation, the downlink control channel corresponding to a special sub-frame can be a downlink control channel, corresponding to a special sub-frame, determined according to an RNTI or the size of DCI or an indicator in DCI.

Figure 4:
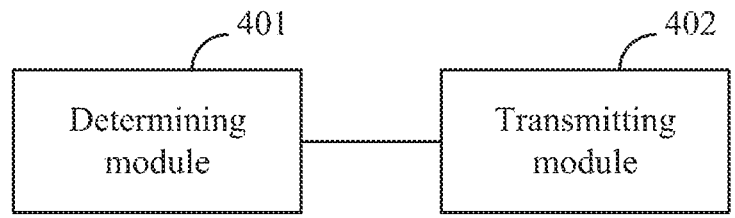
FIG. 4 is a schematic structural diagram of an apparatus for transmitting a PSUCH at an eNB side according to an embodiment of the application.

FIG. 4 is a schematic structural diagram of an apparatus for transmitting a PUSCH at an base station side, and as illustrated, the apparatus includes: a determining module 401 configured to determine to transmit a downlink control channel with an uplink DCI format, and/or a PHICH, in a sub-frame n; and a transmitting module 402 configured to transmit the downlink control channel with the uplink DCI format, and/or the PHICH, in the sub-frame n to adjust or schedule a UE to transmit a PUSCH in a special sub-frame n+k, where k is a predefined value.

In an implementation, for the TDD uplink-downlink configuration 0, in the sub-frame n=0 or 5, k=6 or 11 is defined for a PHICH and/or a downlink control channel corresponding to a special sub-frame; or in the sub-frame n=1 or 6, k=5 or 10 is defined for a PHICH and/or a downlink control channel corresponding to a special sub-frame.

In an implementation, the downlink control channel corresponding to a special sub-frame is a downlink control channel, corresponding to a special sub-frame, determined according to a 2-bit uplink (UL) index indicator in the downlink control channel.

In an implementation: when both an LSB and an MSB in the UL index are set to 0, the downlink control channel corresponds to a PUSCH transmitted in a special sub-frame, and when at least one of the LSB or the MSB in the UL index is set to 1, the downlink control channel corresponds to a PUSCH transmitted in a normal uplink sub-frame.

In an implementation, for the TDD uplink-downlink configuration 1, in the sub-frame n=0 or 5, k=6 or 11 is defined.

Or, for the TDD uplink-downlink configuration 1, in the sub-frame n=4 or 9, k=2 or 7 or 12 is defined for a PHICH and/or a downlink control channel corresponding to a special sub-frame; or in the sub-frame n=1 or 6, k=5 or 10 is defined for a PHICH and/or a downlink control channel corresponding to a special sub-frame.

In an implementation, for the TDD uplink-downlink configuration 2, in the sub-frame n=4 or 9, k=2 or 7 or 12 is defined; or in the sub-frame n=0 or 5, k=6 or 11 is defined; or in the sub-frame n=1 or 6, k=5 or 10 is defined.

Or, for the TDD uplink-downlink configuration 2, in the sub-frame n=3 or 8, k=3 or 8 or 13 is defined for a PHICH and/or a downlink control channel corresponding to a special sub-frame.

In an implementation, for the TDD uplink-downlink configuration 3, in the sub-frame n=7, k=4 is defined; or in the sub-frame n=5, k=6 is defined; or in the sub-frame n=6, k=5 is defined; or in the sub-frame n=1, k=10 is defined.

Or, for the TDD uplink-downlink configuration 3, in the sub-frame n=8, k=3 or 13 is defined for a PHICH and/or a downlink control channel corresponding to a special sub-frame; or in the sub-frame n=9, k=2 or 12 is defined for a PHICH and/or a downlink control channel corresponding to a special sub-frame; or in the sub-frame n=0, k=11 is defined for a PHICH and/or a downlink control channel corresponding to a special sub-frame.

In an implementation, for the TDD uplink-downlink configuration 4, in the sub-frame n=4, k=7 is defined; or in the sub-frame n=5, k=6 is defined; or in the sub-frame n=6, k=5 is defined; or in the sub-frame n=7, k=4 is defined; or in the sub-frame n=0, k=11 is defined; or in the sub-frame n=1, k=10 is defined.

Or, for the TDD uplink-downlink configuration 4, in the sub-frame n=8, k=3 or 13 is defined for a PHICH and/or a downlink control channel corresponding to a special sub-frame; or in the sub-frame n=9, k=2 or 12 is defined for a PHICH and/or a downlink control channel corresponding to a special sub-frame.

In an implementation, for the TDD uplink-downlink configuration 5, in the sub-frame n=3, k=8 is defined, in the sub-frame n=4, k=7 is defined; or in the sub-frame n=5, k=6 is defined; or in the sub-frame n=6, k=5 is defined; or in the sub-frame n=7, k=4 is defined; or in the sub-frame n=0, k=11 is defined; or in the sub-frame n=1, k=10 is defined; or in the sub-frame n=9, k=2 or 12 is defined.

Or, for the TDD uplink-downlink configuration 5, in the sub-frame n=8, k=3 or 13 is defined for a PHICH and/or a downlink control channel corresponding to a special sub-frame.

In an implementation, for the TDD uplink-downlink configuration 6, in the sub-frame n=0 or 5, k=6 or 11 is defined for a PHICH and/or a downlink control channel corresponding to a special sub-frame; or in the sub-frame n=1 or 6, k=5 or 10 is defined for a PHICH and/or a downlink control channel corresponding to a special sub-frame; or in the sub-frame n=9, k=2 or 7 or 12 is defined for a PHICH and/or a downlink control channel corresponding to a special sub-frame.

In an implementation, the PHICH corresponding to a special sub-frame can be a PHICH corresponding to $I_{PHICH}=2$, or a PHICH corresponding to $I_{PHICH}=1$, where $I_{PHICH}$ is a parameter for determining a PHICH resource.

In an implementation, the downlink control channel corresponding to a special sub-frame can be a downlink control channel, corresponding to a special sub-frame, determined according to an RNTI or the size of DCI or an indicator in DCI.

For the sake of a convenient description, the respective components of the apparatuses above have been functionally described as respective modules or units. Of course, the functions of the respective modules or units can be performed in the same one or more pieces of software or hardware in an embodiment of the application.

The technical solutions according to the embodiments of the application can be implemented in the following embodiments.

Figure 5:
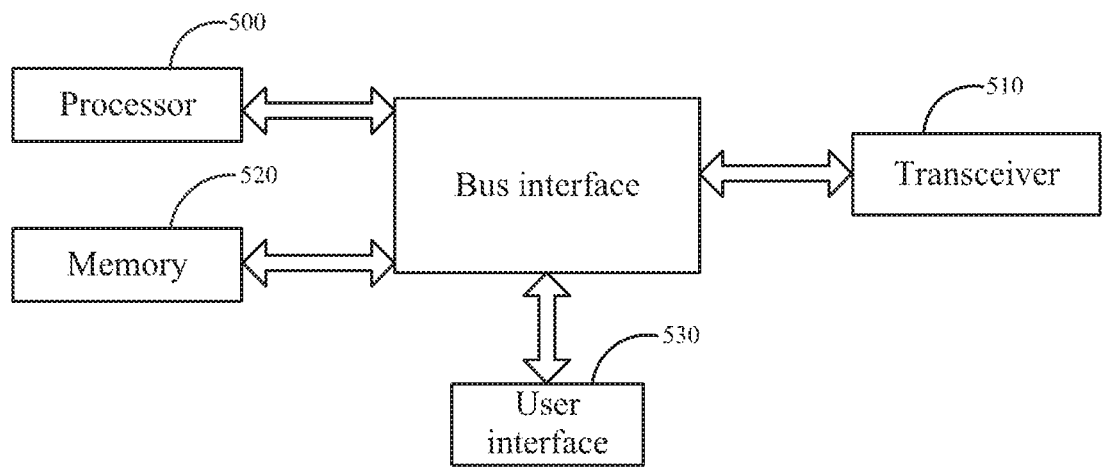
FIG. 5 is a schematic structural diagram of a UE according to an embodiment of the application.

FIG. 5 is a schematic structural diagram of a UE according to an embodiment of the application, and as illustrated, the UE includes: a processor 500 is configured to read and execute programs in a memory 520 to: detect a downlink control channel and/or a PHICH in a sub-frame n; and to adjust or schedule PUSCH transmission in a special sub-frame n+k, according to the downlink control channel with the uplink DCI format, and/or the PHICH, detected in the sub-frame n, where k is a predefined value: and a transceiver 510 configured to transmit and receive data under the control of the processor 500 to: transmit and receive data as needed for the processor.

In an implementation, for the TDD uplink-downlink configuration 0, in the sub-frame n=0 or 5, k=6 or 11 is defined for a PHICH and/or a downlink control channel corresponding to a special sub-frame; or in the sub-frame n=1 or 6, k=5 or 10 is defined for a PHICH and/or a downlink control channel corresponding to a special sub-frame.

In an implementation, the downlink control channel corresponding to a special sub-frame is a downlink control channel, corresponding to a special sub-frame, determined according to a 2-bit uplink (UL) index indicator in the downlink control channel.

In an implementation: when both an LSB and an MSB in the UL index are set to 0, the downlink control channel corresponds to a PUSCH transmitted in a special sub-frame, and when at least one of the LSB or the MSB in the UL index is set to 1, the downlink control channel corresponds to a PUSCH transmitted in a normal uplink sub-frame.

In an implementation, for the TDD uplink-downlink configuration 1, in the sub-frame n=0 or 5, k=6 or 11 is defined.

Or, for the TDD uplink-downlink configuration 1, in the sub-frame n=4 or 9, k=2 or 7 or 12 is defined for a PHICH and/or a downlink control channel corresponding to a special sub-frame; or in the sub-frame n=1 or 6, k=5 or 10 is defined for a PHICH and/or a downlink control channel corresponding to a special sub-frame.

In an implementation, for the TDD uplink-downlink configuration 2, in the sub-frame n=4 or 9, k=2 or 7 or 12 is defined; or in the sub-frame n=0 or 5, k=6 or 11 is defined; or in the sub-frame n=1 or 6, k=5 or 10 is defined.

Or, for the TDD uplink-downlink configuration 2, in the sub-frame n=3 or 8, k=3 or 8 or 13 is defined for a PHICH and/or a downlink control channel corresponding to a special sub-frame.

In an implementation, for the TDD uplink-downlink configuration 3, in the sub-frame n=7, k=4 is defined; or in the sub-frame n=5, k=6 is defined; or in the sub-frame n=6, k=5 is defined; or in the sub-frame n=1, k=10 is defined.

Or, for the TDD uplink-downlink configuration 3, in the sub-frame n=8, k=3 or 13 is defined for a PHICH and/or a downlink control channel corresponding to a special sub-frame; or in the sub-frame n=9, k=2 or 12 is defined for a PHICH and/or a downlink control channel corresponding to a special sub-frame; or in the sub-frame n=0, k=11 is defined for a PHICH and/or a downlink control channel corresponding to a special sub-frame.

In an implementation, for the TDD uplink-downlink configuration 4, in the sub-frame n=4, k=7 is defined; or in the sub-frame n=5, k=6 is defined; or in the sub-frame n=6, k=5 is defined; or in the sub-frame n=7, k=4 is defined; or in the sub-frame n=0, k=11 is defined; or in the sub-frame n=1, k=10 is defined.

Or, for the TDD uplink-downlink configuration 4, in the sub-frame n=8, k=3 or 13 is defined for a PHICH and/or a downlink control channel corresponding to a special sub-frame; or in the sub-frame n=9, k=2 or 12 is defined for a PHICH and/or a downlink control channel corresponding to a special sub-frame.

In an implementation, for the TDD uplink-downlink configuration 5, in the sub-frame n=3, k=8 is defined, in the sub-frame n=4, k=7 is defined; or in the sub-frame n=5, k=6 is defined; or in the sub-frame n=6, k=5 is defined; or in the sub-frame n=7, k=4 is defined; or in the sub-frame n=0, k=11 is defined; or in the sub-frame n=1, k=10 is defined; or in the sub-frame n=9, k=2 or 12 is defined.

Or, for the TDD uplink-downlink configuration 5, in the sub-frame n=8, k=3 or 13 is defined for a PHICH and/or a downlink control channel corresponding to a special sub-frame.

In an implementation, for the TDD uplink-downlink configuration 6, in the sub-frame n=0 or 5, k=6 or 11 is defined for a PHICH and/or a downlink control channel corresponding to a special sub-frame; or in the sub-frame n=1 or 6, k=5 or 10 is defined for a PHICH and/or a downlink control channel corresponding to a special sub-frame; or in the sub-frame n=9, k=2 or 7 or 12 is defined for a PHICH and/or a downlink control channel corresponding to a special sub-frame.

In an implementation, the PHICH corresponding to a special sub-frame can be a PHICH corresponding to $I_{PHICH}=2$, or a PHICH corresponding to $I_{PHICH}=1$, where $I_{PHICH}$ is a parameter for determining a PHICH resource.

In an implementation, the downlink control channel corresponding to a special sub-frame can be a downlink control channel, corresponding to a special sub-frame, determined according to an RNTI or the size of DCI or an indicator in DCI.

Here in FIG. 5, the bus architecture can include any number of interconnecting buses and bridges to particularly link together various circuits including one or more processors represented by the processor 500, and one or more memories represented by the memory 520. The bus architecture can further link together various other circuits, e.g., a peripheral device, a manostat, a power management circuit, etc., all of which are well known in the art, so a further description thereof will be omitted in this context. The bus interface serves as an interface. The transceiver 510 can be a number of elements, e.g., a transmitter and a receiver, which are units for communication with various other devices over a transmission medium. For different UEs, the user interface can be an interface via which desirable devices can be connected externally and internally, where the connected devices include but will not be limited to a keypad, a display, a loudspeaker, a microphone, a joystick, etc.

The processor 500 is responsible for managing the bus architecture and performing normal processes, and the memory 520 can store data for use by the processor 500 in performing the operations.

Figure 6:
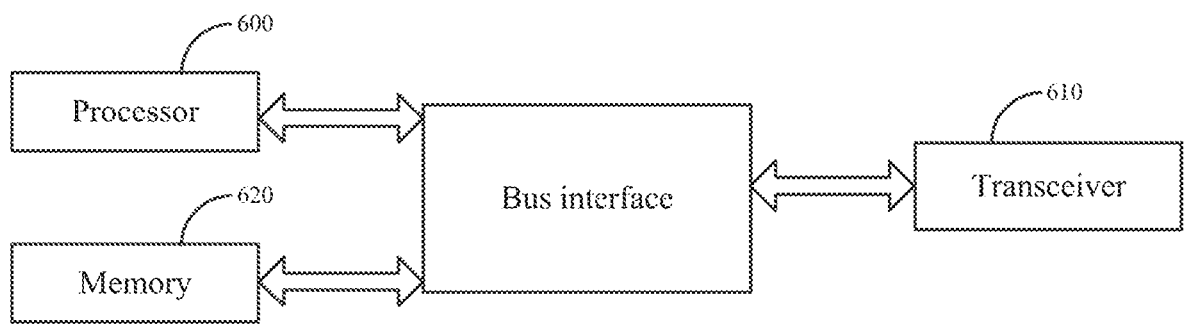
FIG. 6 is a schematic structural diagram of an eNB according to an embodiment of the application.

FIG. 6 is a schematic structural diagram of an base station according to an embodiment of the application, and as illustrated, the base station includes: a processor 600 configured to read and execute programs in a memory 620 to: process data as needed for a transceiver; and the transceiver 610 configured to transmit and receive data under the control of the processor 600 to: to transmit a downlink control channel with an uplink DCI format, and/or a PHICH, in a sub-frame n to adjust or schedule a UE to transmit a PUSCH in a special sub-frame n+k, where k is a predefined value.

In an implementation, for the TDD uplink-downlink configuration 0, in the sub-frame n=0 or 5, k=6 or 11 is defined for a PHICH and/or a downlink control channel corresponding to a special sub-frame; or in the sub-frame n=1 or 6, k=5 or 10 is defined for a PHICH and/or a downlink control channel corresponding to a special sub-frame.

In an implementation, the downlink control channel corresponding to a special sub-frame is a downlink control channel, corresponding to a special sub-frame, determined according to a 2-bit uplink (UL) index indicator in the downlink control channel.

In an implementation: when both an LSB and an MSB in the UL index are set to 0, the downlink control channel corresponds to a PUSCH transmitted in a special sub-frame, and when at least one of the LSB or the MSB in the UL index is set to 1, the downlink control channel corresponds to a PUSCH transmitted in a normal uplink sub-frame.

In an implementation, for the TDD uplink-downlink configuration 1, in the sub-frame n=0 or 5, k=6 or 11 is defined.

Or, for the TDD uplink-downlink configuration 1, in the sub-frame n=4 or 9, k=2 or 7 or 12 is defined for a PHICH and/or a downlink control channel corresponding to a special sub-frame; or in the sub-frame n=1 or 6, k=5 or 10 is defined for a PHICH and/or a downlink control channel corresponding to a special sub-frame.

In an implementation, for the TDD uplink-downlink configuration 2, in the sub-frame n=4 or 9, k=2 or 7 or 12 is defined; or in the sub-frame n=0 or 5, k=6 or 11 is defined; or in the sub-frame n=1 or 6, k=5 or 10 is defined.

Or, for the TDD uplink-downlink configuration 2, in the sub-frame n=3 or 8, k=3 or 8 or 13 is defined for a PHICH and/or a downlink control channel corresponding to a special sub-frame.

In an implementation, for the TDD uplink-downlink configuration 3, in the sub-frame n=7, k=4 is defined; or in the sub-frame n=5, k=6 is defined; or in the sub-frame n=6, k=5 is defined; or in the sub-frame n=, k=10 is defined.

Or, for the TDD uplink-downlink configuration 3, in the sub-frame n=8, k=3 or 13 is defined for a PHICH and/or a downlink control channel corresponding to a special sub-frame; or in the sub-frame n=9, k=2 or 12 is defined for a PHICH and/or a downlink control channel corresponding to a special sub-frame; or in the sub-frame n=0, k=11 is defined for a PHICH and/or a downlink control channel corresponding to a special sub-frame.

In an implementation, for the TDD uplink-downlink configuration 4, in the sub-frame n=4, k=7 is defined; or in the sub-frame n=5, k=6 is defined; or in the sub-frame n=6, k=5 is defined; or in the sub-frame n=7, k=4 is defined; or in the sub-frame n=0, k=11 is defined; or in the sub-frame n=1, k=10 is defined.

Or, for the TDD uplink-downlink configuration 4, in the sub-frame n=8, k=3 or 13 is defined for a PHICH and/or a downlink control channel corresponding to a special sub-frame; or in the sub-frame n=9, k=2 or 12 is defined for a PHICH and/or a downlink control channel corresponding to a special sub-frame.

In an implementation, for the TDD uplink-downlink configuration 5, in the sub-frame n=3, k=8 is defined, in the sub-frame n=4, k=7 is defined; or in the sub-frame n=5, k=6 is defined; or in the sub-frame n=6, k=5 is defined; or in the sub-frame n=7, k=4 is defined; or in the sub-frame n=0, k=11 is defined; or in the sub-frame n=1, k=10 is defined; or in the sub-frame n=9, k=2 or 12 is defined.

Or, for the TDD uplink-downlink configuration 5, in the sub-frame n=8, k=3 or 13 is defined for a PHICH and/or a downlink control channel corresponding to a special sub-frame.

In an implementation, for the TDD uplink-downlink configuration 6, in the sub-frame n=0 or 5, k=6 or 11 is defined for a PHICH and/or a downlink control channel corresponding to a special sub-frame; or in the sub-frame n=1 or 6, k=5 or 10 is defined for a PHICH and/or a downlink control channel corresponding to a special sub-frame; or in the sub-frame n=9, k=2 or 7 or 12 is defined for a PHICH and/or a downlink control channel corresponding to a special sub-frame.

In an implementation, the PHICH corresponding to a special sub-frame can be a PHICH corresponding to $I_{PHICH}=2$, or a PHICH corresponding to $I_{PHICH}=1$, where $I_{PHICH}$ is a parameter for determining a PHICH resource.

In an implementation, the downlink control channel corresponding to a special sub-frame can be a downlink control channel, corresponding to a special sub-frame, determined according to an RNTI or the size of DCI or an indicator in DCI.

Here in FIG. 6, the bus architecture can include any number of interconnecting buses and bridges to particularly link together various circuits including one or more processors represented by the processor 600, and one or more memories represented by the memory 620. The bus architecture can further link together various other circuits, e.g., a peripheral device, a manostat, a power management circuit, etc., all of which are well known in the art, so a further description thereof will be omitted in this context. The bus interface serves as an interface. The transceiver 610 can be a number of elements, e.g., a transmitter and a receiver, which are units for communication with various other devices over a transmission medium. The processor 600 is responsible for managing the bus architecture and performing normal processes, and the memory 620 can store data for use by the processor 600 in performing the operations.

In summary, the technical solutions according to the embodiments of the application provide scheduling timing of a PUSCH to be transmitted in an UpPTS so as to enable the PUSCH to be transmitted normally in the UpPTS.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for transmitting a Physical Uplink Shared Channel (PUSCH), the method comprising:
adjusting or scheduling, by a User Equipment (UE), a PUSCH to be transmitted in a special sub-frame n+k, according to a downlink control channel with an uplink Downlink Control Information (DCI) format, and/or a Physical Hybrid-ARQ Indicator Channel (PHICH), detected in a sub-frame n, wherein k is a predefined value;
wherein at least one of following definitions is used for adjusting or scheduling the PUSCH to be transmitted in the special sub-frame n+k, according to the downlink control channel with the uplink DCI format, and/or the PHICH, detected in the sub-frame n:
for a Time Division Duplex (TDD) uplink-downlink configuration 0, in a sub-frame n=0 or 5, k=6 or 11 is defined; or in a sub-frame n=1 or 6, k=5 or 10 is defined;
for a TDD uplink-downlink configuration 1, in a sub-frame n=0 or 5, k=6 or 11 is defined; or in a sub-frame n=4 or 9, k=2 or 7 or 12 is defined; or in a sub-frame n=1 or 6, k=5 or 10 is defined;
for a TDD uplink-downlink configuration 2, in a sub-frame n=4 or 9, k=2 or 7 or 12 is defined, or in a sub-frame n=0 or 5, k=6 or 11 is defined, or in a sub-frame n=1 or 6, k=5 or 10 is defined; or in a sub-frame n=3 or 8, k=3 or 8 or 13 is defined;
for a TDD uplink-downlink configuration 3, in a sub-frame n=7, k=4 is defined; or in a sub-frame n=5, k=6 is defined; or in a sub-frame n=6, k=5 is defined; or in a sub-frame n=1, k=10 is defined; or in a sub-frame n=8, k=3 or 13 is defined; or in a sub-frame n=9, k=2 or 12 is defined; or in a sub-frame n=0, k=11 is defined;
for a TDD uplink-downlink configuration 4, in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or in a sub-frame n=8, k=3 or 13 is defined; or in a sub-frame n=9, k=2 or 12 is defined;
for a TDD uplink-downlink configuration 5, in a sub-frame n=3, k=8 is defined; or in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or in a sub-frame n=9, k=2 or 12 is defined; or in a sub-frame n=8, k=3 or 13 is defined; or
for a TDD uplink-downlink configuration 6, in a sub-frame n=0 or 5, k=6 or 11 is defined; or in a sub-frame n=1 or 6, k=5 or 10 is defined; or in a sub-frame n=9, k=2 or 7 or 12 is defined;

wherein when the definitions is used for adjusting or scheduling the PUSCH to be transmitted in the special sub-frame n+k, according to only the downlink control channel with the uplink DCI format: when both a Least Significant Bit (LSB) and a Most Significant Bit (MSB) in a 2-bit UL index in the downlink control channel are set to 0, the downlink control channel corresponds to a PUSCH transmitted in the special sub-frame, and when at least one of the LSB or the MSB in the UL index is set to 1, the downlink control channel corresponds to a PUSCH transmitted in a normal uplink sub-frame.

2. The method according to claim 1, wherein the PHICH corresponding to the special sub-frame is a PHICH corresponding to $I^{PHICH}=2$, or a PHICH corresponding to $I^{PHICH}=1$, wherein $I^{PHICH}$ is a parameter for determining a PHICH resource; and/or, wherein the downlink control channel corresponding to the special sub-frame is a downlink control channel, corresponding to the special sub-frame, determined according to a Radio Network Temporary Identifier (RNTI) or a size of DCI or an indicator in DCI.

3. A method for transmitting a Physical Uplink Shared Channel (PUSCH), the method comprising:

transmitting, by a base station, a downlink control channel with an uplink Downlink Control Information (DCI) format, and/or a Physical Hybrid-ARQ Indicator Channel (PHICH), in a sub-frame n to adjust or schedule a User Equipment (UE) to transmit a PUSCH in a special sub-frame n+k, wherein k is a predefined value;

wherein at least one of following definitions is used for adjusting or scheduling the PUSCH to be transmitted in the special sub-frame n+k, according to the downlink control channel with the uplink DCI format, and/or the PHICH, detected in the sub-frame n:

for a Time Division Duplex (TDD) uplink-downlink configuration 0, in a sub-frame n=0 or 5, k=6 or 11 is defined; or in a sub-frame n=1 or 6, k=5 or 10 is defined;

for a TDD uplink-downlink configuration 1, in a sub-frame n=0 or 5, k=6 or 11 is defined; or in a sub-frame n=4 or 9, k=2 or 7 or 12 is defined; or in a sub-frame n=1 or 6, k=5 or 10 is defined;

for a TDD uplink-downlink configuration 2, in a sub-frame n=4 or 9, k=2 or 7 or 12 is defined, or in a sub-frame n=0 or 5, k=6 or 11 is defined, or in a sub-frame n=1 or 6, k=5 or 10 is defined; or in a sub-frame n=3 or 8, k=3 or 8 or 13 is defined;

for a TDD uplink-downlink configuration 3, in a sub-frame n=7, k=4 is defined; or in a sub-frame n=5, k=6 is defined; or in a sub-frame n=6, k=5 is defined; or in a sub-frame n=1, k=10 is defined; or in a sub-frame n=8, k=3 or 13 is defined; or in a sub-frame n=9, k=2 or 12 is defined; or in a sub-frame n=0, k=11 is defined;

for a TDD uplink-downlink configuration 4, in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or in a sub-frame n=8, k=3 or 13 is defined; or in a sub-frame n=9, k=2 or 12 is defined;

for a TDD uplink-downlink configuration 5, in a sub-frame n=3, k=8 is defined; or in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or in a sub-frame n=9, k=2 or 12 is defined; or in a sub-frame n=8, k=3 or 13 is defined; or for a TDD uplink-downlink configuration 6, in a sub-frame n=0 or 5, k=6 or 11 is defined; or in a sub-frame n=1 or 6, k=5 or 10 is defined; or in a sub-frame n=9, k=2 or 7 or 12 is defined;

wherein when the definitions is used for adjusting or scheduling the PUSCH to be transmitted in the special sub-frame n+k, according to only the downlink control channel with the uplink DCI format: when both a Least Significant Bit (LSB) and a Most Significant Bit (MSB) in a 2-bit UL index in the downlink control channel are set to 0, the downlink control channel corresponds to a PUSCH transmitted in the special sub-frame, and when at least one of the LSB or the MSB in the UL index is set to 1, the downlink control channel corresponds to a PUSCH transmitted in a normal uplink sub-frame.

4. The method according to claim 3, wherein the PHICH corresponding to a special sub-frame is a PHICH corresponding to $I^{PHICH}=2$, or a PHICH corresponding to $I^{PHICH}=1$, wherein $I^{PHICH}$ is a parameter for determining a PHICH resource; and/or, wherein the downlink control channel corresponding to the special sub-frame is a downlink control channel, corresponding to the special sub-frame, determined according to a Radio Network Temporary Identifier (RNTI) or a size of DCI or an indicator in DCI.

5. A User Equipment (UE), comprising:

a processor, a memory, and a transceiver, wherein:

the processor is configured to read and execute programs in the memory to:

adjust or schedule a Physical Uplink Shared Channel (PUSCH) to be transmitted in a special sub-frame n+k, according to a downlink control channel with an uplink Downlink Control Information (DCI) format, and/or a Physical Hybrid-ARQ Indicator Channel (PHICH), detected in a sub-frame n, wherein k is a predefined value; and the transceiver is configured to transmit and receive data under the control of the processor;

wherein at least one of following definitions is used for adjusting or scheduling the PUSCH to be transmitted in the special sub-frame n+k, according to the downlink control channel with the uplink DCI format, and/or the PHICH, detected in the sub-frame n:

for a Time Division Duplex (TDD) uplink-downlink configuration 0, in a sub-frame n=0 or 5, k=6 or 11 is defined; or in a sub-frame n=1 or 6, k=5 or 10 is defined;

for a TDD uplink-downlink configuration 1, in a sub-frame n=0 or 5, k=6 or 11 is defined; or in a sub-frame n=4 or 9, k=2 or 7 or 12 is defined; or in a sub-frame n=1 or 6, k=5 or 10 is defined;

for a TDD uplink-downlink configuration 2, in a sub-frame n=4 or 9, k=2 or 7 or 12 is defined, or in a sub-frame n=0 or 5, k=6 or 11 is defined, or in a sub-frame n=1 or 6, k=5 or 10 is defined; or in a sub-frame n=3 or 8, k=3 or 8 or 13 is defined;

for a TDD uplink-downlink configuration 3, in a sub-frame n=7, k=4 is defined; or in a sub-frame n=5, k=6 is defined; or in a sub-frame n=6, k=5 is defined; or in a sub-frame n=1, k=10 is defined; or in a sub-frame n=8, k=3 or 13 is defined; or in a sub-frame n=9, k=2 or 12 is defined; or in a sub-frame n=0, k=11 is defined;

for a TDD uplink-downlink configuration 4, in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or in a sub-frame n=8, k=3 or 13 is defined; or in a sub-frame n=9, k=2 or 12 is defined;

for a TDD uplink-downlink configuration 5, in a sub-frame n=3, k=8 is defined; or in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or in a sub-frame n=9, k=2 or 12 is defined; or in a sub-frame n=8, k=3 or 13 is defined; or for a TDD uplink-downlink configuration 6, in a sub-frame n=0 or 5, k=6 or 11 is defined; or in a sub-frame n=1 or 6, k=5 or 10 is defined; or in a sub-frame n=9, k=2 or 7 or 12 is defined;

wherein when the definitions is used for adjusting or scheduling the PUSCH to be transmitted in the special sub-frame n+k, according to only the downlink control channel with the uplink DCI format: when both a Least Significant Bit (LSB) and a Most Significant Bit (MSB) in a 2-bit UL index in the downlink control channel are set to 0, the downlink control channel corresponds to a PUSCH transmitted in the special sub-frame, and when at least one of the LSB or the MSB in the UL index is set to 1, the downlink control channel corresponds to a PUSCH transmitted in a normal uplink sub-frame.

6. The UE according to claim 5, wherein the PHICH corresponding to the special sub-frame is a PHICH corresponding to $I^{PHICH}=2$; or a PHICH corresponding to $I^{PHICH}=1$, wherein $I^{PHICH}$ is a parameter for determining a PHICH resource; and/or, wherein the downlink control channel corresponding to the special sub-frame is a downlink control channel, corresponding to the special sub-frame, determined according to a Radio Network Temporary Identifier (RNTI) or a size of DCI or an indicator in DCI.

7. A base station, comprising:
a processor, a memory, and a transceiver, wherein:
the processor is configured to read and execute programs in the memory to:
process data as needed for the transceiver; and
the transceiver is configured to transmit and receive data under the control of the processor to:
transmit a downlink control channel with an uplink Downlink Control Information (DCI) format, and/or a Physical Hybrid-ARQ Indicator Channel (PHICH), in a sub-frame n to adjust or schedule a UE to transmit a Physical Uplink Shared Channel (PUSCH) in a special sub-frame n+k, wherein k is a predefined value;
wherein at least one of following definitions is used for adjusting or scheduling the PUSCH to be transmitted in the special sub-frame n+k, according to the downlink control channel with the uplink DCI format, and/or the PHICH, detected in the sub-frame n:
for a Time Division Duplex (TDD) uplink-downlink configuration 0, in a sub-frame n=0 or 5, k=6 or 11 is defined; or in a sub-frame n=1 or 6, k=5 or 10 is defined;

for a TDD uplink-downlink configuration 1, in a sub-frame n=0 or 5, k=6 or 11 is defined; or in a sub-frame n=4 or 9, k=2 or 7 or 12 is defined; or in a sub-frame n=1 or 6, k=5 or 10 is defined;

for a TDD uplink-downlink configuration 2, in a sub-frame n=4 or 9, k=2 or 7 or 12 is defined, or in a sub-frame n=0 or 5, k=6 or 11 is defined, or in a sub-frame n=1 or 6, k=5 or 10 is defined; or in a sub-frame n=3 or 8, k=3 or 8 or 13 is defined;

for a TDD uplink-downlink configuration 3, in a sub-frame n=7, k=4 is defined; or in a sub-frame n=5, k=6 is defined; or in a sub-frame n=6, k=5 is defined; or in a sub-frame n=1, k=10 is defined; or in a sub-frame n=8, k=3 or 13 is defined; or in a sub-frame n=9, k=2 or 12 is defined; or in a sub-frame n=0, k=11 is defined;

for a TDD uplink-downlink configuration 4, in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or in a sub-frame n=8, k=3 or 13 is defined; or in a sub-frame n=9, k=2 or 12 is defined;

for a TDD uplink-downlink configuration 5, in a sub-frame n=3, k=8 is defined; or in a sub-frame n=4, k=7 is defined; or in a sub-frame n=5, k=6 is defined; or in a sub-frame n=6, k=5 is defined; or in a sub-frame n=7, k=4 is defined; or in a sub-frame n=0, k=11 is defined; or in a sub-frame n=1, k=10 is defined; or in a sub-frame n=9, k=2 or 12 is defined; or in a sub-frame n=8, k=3 or 13 is defined; or for a TDD uplink-downlink configuration 6, in a sub-frame n=0 or 5, k=6 or 11 is defined; or in a sub-frame n=1 or 6, k=5 or 10 is defined; or in a sub-frame n=9, k=2 or 7 or 12 is defined;

wherein when the definitions is used for adjusting or scheduling the PUSCH to be transmitted in the special sub-frame n+k, according to only the downlink control channel with the uplink DCI format: when both a Least Significant Bit (LSB) and a Most Significant Bit (MSB) in a 2-bit UL index in the downlink control channel are set to 0, the downlink control channel corresponds to a PUSCH transmitted in the special sub-frame, and when at least one of the LSB or the MSB in the UL index is set to 1, the downlink control channel corresponds to a PUSCH transmitted in a normal uplink sub-frame.

8. The base station according to claim 7, wherein the PHICH corresponding to the special sub-frame is a PHICH corresponding to $I^{PHICH}=2$; or a PHICH corresponding to $I^{PHICH}=1$, wherein $I^{PHICH}$ is a parameter for determining a PHICH resource; and/or, wherein the downlink control channel corresponding to the special sub-frame is a downlink control channel, corresponding to the special sub-frame, determined according to a Radio Network Temporary Identifier (RNTI) or a size of DCI or an indicator in DCI.

* * * * *